US012618662B2

(12) United States Patent (10) Patent No.: US 12,618,662 B2
Houda et al. (45) Date of Patent: May 5, 2026

(54) MULTI-ROTATION ANGLE DETECTION DEVICE, AND SEGMENT COUNTER FOR SAME

(71) Applicant: ORIENTAL MOTOR CO., LTD., Tokyo (JP)

(72) Inventors: Akihiko Houda, Tsukuba (JP); Masayuki Someya, Tsukuba (JP)

(73) Assignee: ORIENTAL MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/123,707

(22) PCT Filed: Oct. 11, 2023

(86) PCT No.: PCT/JP2023/036928
§ 371 (c)(1),
(2) Date: Apr. 23, 2025

(87) PCT Pub. No.: WO2024/090210
PCT Pub. Date: May 2, 2024

(65) Prior Publication Data
US 2026/0009633 A1 Jan. 8, 2026

(30) Foreign Application Priority Data

Oct. 25, 2022 (JP) ................................. 2022-170648
Jan. 26, 2023 (JP) ................................. 2023-010486

(51) Int. Cl.
*G01B 7/30* (2006.01)
*G01D 5/14* (2006.01)
(Continued)

(52) U.S. Cl.
CPC .......... *G01B 7/30* (2013.01); *G01D 5/24485* (2013.01); *G01D 5/2455* (2013.01); *G01D 5/145* (2013.01); *G01D 2205/26* (2021.05)

(58) Field of Classification Search
CPC .... G01B 7/30; G01D 5/24485; G01D 5/2455; G01D 5/145; G01D 2205/26;
(Continued)

(56) References Cited

U.S. PATENT DOCUMENTS 7,060,965 B2 * 6/2006 Vidovic ................ G01L 9/0079
385/13
10,190,889 B2 1/2019 Mehnert et al.
(Continued)

FOREIGN PATENT DOCUMENTS

CN 104246444 A 12/2014
CN 114270673 A 4/2022
(Continued)

OTHER PUBLICATIONS

International Preliminary Report on Patentability dated May 8, 2025, and its English Translation issued by the International Bureau in PCT/JP2023/036928.

*Primary Examiner* — Christopher P McAndrew
(74) *Attorney, Agent, or Firm* — Rabin & Berdo, P.C.

(57) ABSTRACT

A multiturn angle detection device includes: a segment counter to count segments in an angular range over the single turn of a rotation shaft; a precision absolute angle detector to generate an absolute angle detection value within the single-turn cycle; and an arithmetic device to generate a multiturn absolute angle detection value by combining the output of the segment counter with the output of the precision absolute angle detector. The segment counter includes: a single power generation sensor; a magnetic field generation source; a sensor element; and a nonvolatile memory to store a count value. The magnetic field generation source applies a two or more-cycle alternating magnetic field per each turn of the rotation shaft axially of a magnetic wire. The arithmetic device uses the count value stored in the non- (Continued)

volatile memory as it is when receiving external electric power supply.

8 Claims, 11 Drawing Sheets

(51) Int. Cl.
    *G01D 5/244*          (2006.01)
    *G01D 5/245*          (2006.01)

(58) Field of Classification Search
    CPC .... G01D 5/24461; G01D 5/249; G01D 5/245;
                                    G01P 3/4815
    USPC ..................................................... 324/207.25
    See application file for complete search history.

(56) References Cited

U.S. PATENT DOCUMENTS

| | | | |
|---|---|---|---|
| 11,060,571 B2 * | 7/2021 | Dietrich | ............... F16D 48/064 |
| 2005/0258840 A1 * | 11/2005 | Ausserlechner | ..... G01R 33/075 |
| | | | 324/706 |
| 2006/0164077 A1 | 7/2006 | Mehnert et al. | |
| 2009/0039872 A1 * | 2/2009 | Fischer | .................. G01D 5/245 |
| | | | 324/207.13 |
| 2010/0013466 A1 * | 1/2010 | Steinich | ................. G01D 5/145 |
| | | | 324/207.25 |

| | | | |
|---|---|---|---|
| 2010/0213927 A1 | 8/2010 | Mehnert et al. | |
| 2012/0268109 A1 | 10/2012 | Mehnert et al. | |
| 2015/0015245 A1 | 1/2015 | Inoue et al. | |
| 2015/0367887 A1 | 12/2015 | Fujita et al. | |
| 2016/0288823 A1 | 10/2016 | Mikamo | |
| 2018/0231399 A1 * | 8/2018 | Okumura | .................. G01B 7/30 |
| 2018/0231400 A1 * | 8/2018 | Okumura | ............. G01D 5/2454 |
| 2018/0340799 A1 | 11/2018 | Goto | |
| 2019/0170497 A1 * | 6/2019 | Ausserlechner | ......... G01B 7/30 |
| 2019/0346287 A1 | 11/2019 | Koike et al. | |
| 2020/0300941 A1 * | 9/2020 | Antoku | .................. G01D 5/145 |
| 2021/0251707 A1 * | 8/2021 | Luptak | .................. B25J 13/025 |

FOREIGN PATENT DOCUMENTS

| | | | |
|---|---|---|---|
| JP | 2006-523822 | A | 10/2006 |
| JP | 2009-031290 | A | 2/2009 |
| JP | 2009162730 | A | 7/2009 |
| JP | 5730809 | B2 | 6/2015 |
| JP | 2016-005918 | A | 1/2016 |
| JP | 2016-191702 | A | 11/2016 |
| JP | 6226811 | B2 | 11/2017 |
| JP | 2019-215310 | A | 12/2019 |
| JP | 2020-079000 | A | 5/2020 |
| JP | 2021-012212 | A | 2/2021 |
| JP | 2021-021682 | A | 2/2021 |
| JP | 2022-079329 | A | 5/2022 |
| WO | 2021215076 | A1 | 10/2021 |

* cited by examiner

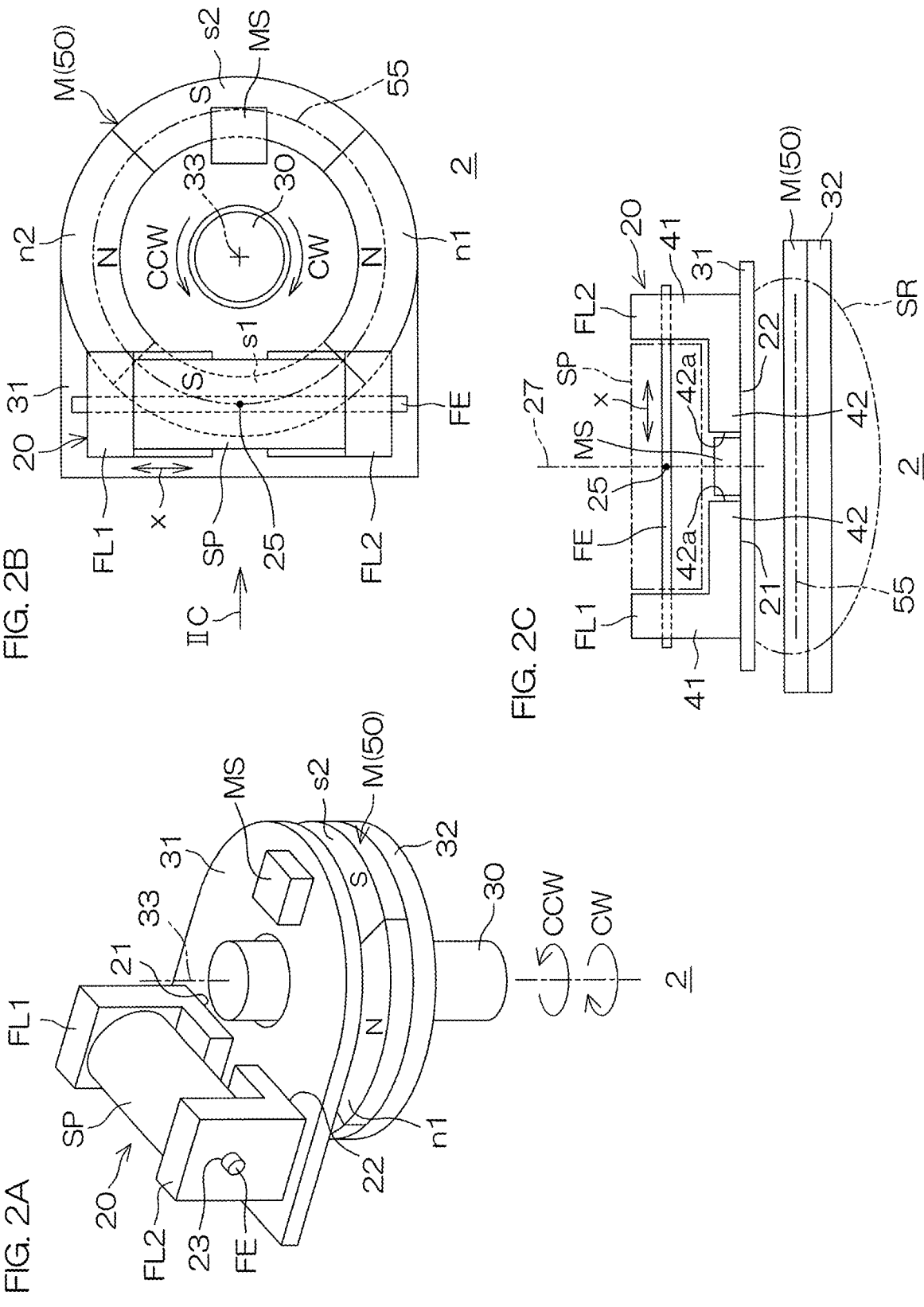

Initial State
(Balanced)

Trigger Negative

Set (Positive)

FIG. 5

| NEW | OLD | Counter operation |
|---|---|---|
| HP | HP | 0 |
| | HN | +1 |
| | LP | +2 |
| | LN | +1 |
| HN | HP | -1 |
| | HN | 0 |
| | LP | -1 |
| | LN | -2 |
| LP | HP | -2 |
| | HN | -1 |
| | LP | 0 |
| | LN | -1 |
| LN | HP | +1 |
| | HN | +2 |
| | LP | +1 |
| | LN | 0 |

MULTI-ROTATION ANGLE DETECTION DEVICE, AND SEGMENT COUNTER FOR SAME

RELATED APPLICATION

This application claims the benefit of priority to Japanese Patent Application Nos. 2022-170648 and 2023-010486, filed on Oct. 25, 2022 and on Jan. 26, 2023, respectively, the disclosure of which is entirely incorporated herein by reference.

DESCRIPTION

Technical Field

The present invention relates to a multiturn angle detection device employing a power generation sensor. More specifically, the present invention relates to a device that detects a multiturn absolute angle over a single turn by combining the count value of a segment counter employing the power generation sensor with an angle detection value obtained from an angle detector capable of precisely detecting an absolute angle based on a single turn cycle. Further, the present invention relates to a segment counter for the multiturn angle detection device.

Background Art

Magnetic wires having a large Barkhausen effect (large Barkhausen jump) are known in the name of Wiegand wire or pulse wire. Such a magnetic wire includes a core portion, and a shell portion provided around the core portion. One of the core portion and the shell portion is a soft (magnetically soft) layer in which its magnetization direction is reversed even by application of a weak magnetic field, and the other of the core portion and the shell portion is a hard (magnetically hard) layer in which its magnetization direction is reversed only by application of a strong magnetic field. A power generation sensor is produced by winding a coil around the magnetic wire.

When the hard layer and the soft layer are magnetized in the same direction axially of the wire and the strength of an external magnetic field applied in a direction opposite to that magnetization direction is increased to a certain magnetic field strength, the magnetization direction of the soft layer is reversed. The reversal of the magnetization direction starts at a certain position of the magnetic wire to propagate to the entire wire, whereby the magnetization direction of the soft layer is totally reversed. At this time, the large Barkhausen effect is exhibited to induce a pulse signal in the coil wound around the magnetic wire. When the external magnetic field strength is further increased to another certain magnetic field strength, the magnetization direction of the hard layer is reversed.

The magnetic field strength at which the magnetization direction of the soft layer is reversed is herein referred to as "operational magnetic field" and the magnetic field strength at which the magnetization direction of the hard layer is reversed is herein referred to as "stabilization magnetic field."

A voltage outputted from the coil is characteristically constant irrespective of the change rate of an input magnetic field (external magnetic field), and is free from chattering because of its hysteresis with respect to the input magnetic field. For this reason, the pulse signal outputted from the coil is used in a position detection device and the like.

Where an alternating magnetic field is applied to the power generation sensor, two pulse signals including one positive pulse signal and one negative pulse signal are generated per each cycle. Magnets are used as a magnetic field generation source, and the alternating magnetic field is applied to the power generation sensor by relative movement of the magnets and the power generation sensor. Thus, a position can be detected by counting generated pulse signals.

Since the output from the coil has electric power, a sensor of power generation type (power generation sensor) requiring no external electric power supply can be provided. That is, a peripheral circuit can also be operated by an energy outputted from the coil without the external electric power supply.

An angle sensor such as an absolute encoder is intrinsically incapable of detecting an angle over a single turn. As long as the electric power is supplied, an angle of one or more turns can be detected by summing up movement amounts. If the power supply is cut off, however, information about the one or more turns is lost.

On the other hand, a segment counter employing the power generation sensor can utilize the energy outputted from the coil even if the external electric power supply is cut off. Therefore, the segment counter can continue the counting to detect one or more turns or multiple turns. In general, however, the segment counter employing the power generation sensor can only roughly detect the angle. Where the segment counter is used for motor control requiring precise angle detection, therefore, a precise multiturn angle detection value (multiturn absolute angle detection value) is utilized, which is determined by combining the count value of the segment counter with the angle detection value of a separate precision absolute angle detector.

PTL 1 and PTL 2 disclose methods and devices each adapted to combine the count value of the segment counter with the angle detection value of the precision absolute angle detector.

PTL 1 utilizes a segment counter including three power generation sensors disposed at positions with a phase difference of 60 degrees.

When the direction of the movement of a rotor is changed, the movement direction cannot be determined only based on the output of a single power generation sensor. Where a plurality of power generation sensors are used, therefore, the movement direction can be determined by using phase differences among the outputs of the respective power generation sensors.

In order to output a voltage pulse from each of the power generation sensors, it is necessary to reverse the magnetization direction of only the soft layer from a state such that the magnetization directions of the hard layer and the soft layer of the magnetic wire are consistent. Even if the magnetization direction of only the soft layer is reversed in a state such that the magnetization directions of the hard layer and the soft layer are inconsistent, no pulse signal is generated or a pulse signal having a very small amplitude is generated.

Where the rotor is continuously rotated in one direction, the magnetic field reaches the stabilization magnetic field at a certain timing after reaching the operational magnetic field to output a voltage pulse before reaching the operational magnetic field again. Therefore, a voltage pulse is certainly generated at an angle position at which the operational magnetic field is reached.

Where the rotor is rotated in both directions (i.e., the rotation direction is changed), however, the power generation sensor is liable to fail to output a voltage pulse (i.e., so-called pulse missing is liable to occur) even if the operational magnetic field is reached. Specifically, no voltage pulse is outputted, even if the magnetic field reaches the operational magnetic field again with the rotation direction reversed before reaching the stabilization magnetic field after reaching the operational magnetic field to output a voltage pulse. This is because the magnetization directions of the hard layer and the soft layer are inconsistent.

With the provision of the plurality of power generation sensors at the positions with a phase difference, the rotation direction can be determined by using the phase differences among the output pulses of the power generation sensors. Even with the use of two power generation sensors, however, the rotation direction cannot be determined, if the pulse missing occurs in either of the power generation sensors. Therefore, as disclosed in PTL 1, it is necessary to use the three power generation sensors. In PTL 1, the three power generation sensors are arranged with a phase difference of 60 degrees to combine the count value of the segment counter with the detection value of the precision position detector and to correct an offset of the origin.

However, the use of the plurality of power generation sensors increases the size and the costs of the position detector.

PTL 2 discloses a segment counter that determines a rotation direction by processing the pulse signal of a single power generation sensor and the output signal of a sensor element different from the power generation sensor, and performs a counting operation according to the result of the determination. Even in this case, the segment counter suffers from inconvenience if the pulse missing occurs when the count value of the segment counter and the detection value of the precision position detector are combined with each other. In PTL 2, therefore, the magnetization state of the magnetic wire of the power generation sensor is monitored, and the value of the segment counter is corrected for a missing voltage pulse according to the magnetization state. Thus, the count value of the segment counter and the detection value of the precision position detector are synchronized and combined with each other.

Specifically, an electric current flowing through the coil of the power generation sensor is gradually increased, and a magnetic field generated by the coil is applied to the magnetic wire for the monitoring of the magnetization state as disclosed in PTL 2. Thereby, whether or not the magnetization direction of the magnetic wire is reversed is monitored by observing a voltage appearing between the opposite ends of the coil. Thus, the magnetization state of the magnetic wire can be checked.

However, PTL 2 requires a complicated signal processing operation for the determination of the magnetization direction of the magnetic wire and for the correction of the count value based on the result of the determination. This correspondingly makes it difficult to reduce the size and the costs of the device.

CITATION LIST

Patent Literature

PTL 1: JP6226811
PTL 2: JP5730809

SUMMARY OF INVENTION

Problems to be Solved by Invention

One example embodiment of the present invention provides a multiturn angle detection device that is advantageous for the size reduction and the cost reduction thereof.

More specifically, the example embodiment of the present invention provides a multiturn angle detection device that can generate a multiturn absolute angle detection value by combining the count value of a segment counter not employing a plurality of power generation sensors with the angle detection value of a precision absolute angle detector without the need for complicated signal processing.

Another example embodiment of the present invention provides a segment counter that counts segments according to a novel algorism, and a multiturn angle detection device including the segment counter.

Solution to Problems

The example embodiments of the present invention provide a multiturn angle detection device and a segment counter having the following features:

1. A multiturn angle detection device to generate the multiturn absolute angle detection value of a rotating body that is rotated about a rotation axis, the multiturn angle detection device comprising:

a segment counter to generate a count value according to the rotation of the rotating body by counting segments defined by dividing the single-turn cycle of the rotating body in an angular range over the single turn of the rotating body;

a precision absolute angle detector, operative with external electric power supply, to generate an absolute angle detection value within the single-turn cycle of the rotating body at a resolution higher than the segments; and an arithmetic device, operative with the external electric power supply, to generate the multiturn absolute angle detection value of the rotating body by combining the count value of the segment counter with the absolute angle detection value of the precision absolute angle detector;

wherein the segment counter includes a single power generation sensor, a magnetic field generation source to be rotated together with the rotating body about the rotation axis, a sensor element different from the power generation sensor, and a nonvolatile memory to store the count value;

wherein the power generation sensor includes a magnetic wire that exhibits a large Barkhausen effect, and a coil wound around the magnetic wire, and generates a voltage pulse according to a magnetic field change occurring due to the rotation of the magnetic field generation source;

wherein the magnetic field generation source applies a two or more-cycle alternating magnetic field per each turn of the rotating body axially of the magnetic wire;

wherein the segment counter is operative with the energy of the voltage pulse generated by the power generation sensor without receiving the external electric power supply and, when the power generation sensor generates the voltage pulse, determines the rotation direction and the rotational position of the rotating body by using the polarity of the voltage pulse (hereinafter referred to as "new voltage pulse polarity"), an output state of the sensor element observed when the voltage pulse is generated (hereinafter referred to as "new sensor element state"), the polarity of a previous voltage pulse (hereinafter referred to as "previous voltage pulse polarity"), an output state of the sensor element observed when the previous voltage pulse is generated (hereinafter referred to as "previous sensor element state"), and a count value updated by the generation of the previous voltage pulse and stored in the nonvolatile memory (hereinafter referred to as "previous count value"), and updates the count value and stores the updated count value in the nonvolatile memory;

wherein the segment counter updates the count value by:

determining the rotation direction of the rotating body based on a combination of the new voltage pulse polarity and the new sensor element state to determine a count amount sign;

setting a count amount absolute value to 1 if the new voltage pulse polarity is different from the previous voltage pulse polarity;

setting the count amount absolute value to 0 if the new voltage pulse polarity is the same as the previous voltage pulse polarity and the new sensor element state is the same as the previous sensor element state;

setting the count amount absolute value to 2 if the new voltage pulse polarity is the same as the previous voltage pulse polarity and the new sensor element state is different from the previous sensor element state; and prefixing the determined count amount sign to the count amount absolute value to obtain a count amount, and adding the count amount to the previous count value;

wherein the arithmetic device uses the count value stored in the nonvolatile memory as it is when receiving the external electric power supply, and generates the multiturn absolute angle detection value of the rotating body by combining the count value of the segment counter with the absolute angle detection value of the precision absolute angle detector.

With this arrangement, the magnetic field generation source is rotated together with the rotating body about the rotation axis, whereby the magnetic field generation source applies the two or more-cycle alternating magnetic field per each turn axially of the magnetic wire. Thereby, the power generation sensor generates four or more voltage pulses per each turn. For example, the segment counter can generate the count value by counting segments defined by dividing the single-turn cycle into four or more. Even if the pulse missing occurs due to the reversal of the rotation direction to correspondingly cause a count error, the error is not a critical error such that the same count value is generated in an angular range over one turn. Thus, the two or more-cycle alternating magnetic field per each turn is applied to the magnetic wire and the magnetic wire generates the four or more voltage pulses per each turn, whereby a precise multiturn absolute angle value can be uniquely determined for a given multiturn absolute angle based on a combination of the count value of the segment counter and the absolute angle detection value of the precision absolute angle detector. That is, even if the count value of the segment counter contains an error, the count value can be combined with the angle detection value of the precision absolute angle detector without performing the correcting process on the count value (i.e., by using the count value as it is).

Thus, the precise multiturn absolute angle detection value can be generated with the use of the sole power generation sensor by combining the count value of the segment counter with the angle detection value of the precision absolute angle detector without performing a magnetization direction determining process to determine the magnetization direction of the magnetic wire and performing a correction/synchronization process based on the result of the determination.

In this example embodiment, the segment counter performs a counting operation according to all the voltage pulses generated by the power generation sensor, and operates according to a novel algorism for compensation for the pulse missing. That is, the segment counter determines the rotation direction of the rotating body according to the combination of the new voltage pulse polarity and the new sensor element state to determine the count amount sign.

When the rotating body is rotated in one direction, the polarity of the voltage pulse is alternately changed. Therefore, if the polarity of the voltage pulse is changed, it is considered that a rotation angle change occurs across any of the segments. Therefore, the segment counter sets the count amount absolute value to 1 if the new voltage pulse polarity is different from the previous voltage pulse polarity.

Where the pulse missing occurs due to the reversal of the rotation direction, there is a possibility that voltage pulses of the same polarity are consecutively generated and the same sensor element state is observed. In this case, it is considered that the rotating body is moved back to the same angular position and, hence, it is reasonable to keep the count amount unchanged. Therefore, the segment counter sets the count amount absolute value to 0 if the new voltage pulse polarity is the same as the previous voltage pulse polarity and the new sensor element state is the same as the previous sensor element state.

Further, where the pulse missing occurs due to the reversal of the rotation direction, there is another possibility that voltage pulses of the same polarity are consecutively generated and, on the other hand, the sensor element state is changed. In this case, it is considered that the rotating body is rotated across a segment boundary twice. Therefore, the segment counter sets the count amount absolute value to 2 if the new voltage pulse polarity is the same as the previous voltage pulse polarity and the new sensor element state is different from the previous sensor element state.

The segment counter prefixes the determined sign to the count amount absolute value determined in the aforementioned manner to determine the count amount, and then adds the count amount to the previous count value to update the count value.

This makes it possible to perform the counting operation according to all the voltage pulses generated by the power generation sensor and to compensate for the pulse missing. Since the compensation for the pulse missing is achieved by the generation of the voltage pulses, the count value of the segment counter is liable to contain an error. Even in this case, the count value of the segment counter can be used as it is to be combined with the absolute angle detection value as described above.

2. In the multiturn angle detection device according to Item 1, when the power generation sensor generates the voltage pulse, the segment counter stores the polarity of the voltage pulse and the output state of the sensor element observed at the generation of the voltage pulse in the nonvolatile memory.

Thus, the segment counter acquires information about the previous voltage pulse polarity and the previous sensor element state from the nonvolatile memory, and performs the counting operation.

3. In the multiturn angle detection device according to Item 1 or 2, the segment counter counts segments that are defined by dividing the single-turn cycle of the rotating body into four or more.

With this arrangement, the segment counter can count the four or more segments per each turn. Typically, where the magnetic field generation source applies a k-cycle alternating magnetic field (wherein k≥2) per each turn of the rotating body to the magnetic wire, the number of the segments is 2k.

4. In the multiturn angle detection device according to any one of Items 1 to 3, the magnetic field generation source includes two or more magnetic pole pairs disposed on a circle defined about the rotation axis with their N-poles and S-poles alternately arranged.

Consideration will be given, for example, to an initial state in which one S-pole is opposed to the middle portion of the power generation sensor and magnetic fluxes from N-poles disposed in pair on opposite sides of the S-pole are balanced with each other in a set state (a set state for negative pulse generation) in which the soft layer and the hard layer of the magnetic wire is magnetized in a direction extending from a first end to a second end of the magnetic wire. When the magnetic field generation source is slightly rotated together with the rotating body from the initial state, a magnetic flux directed from the first end to the second end of the magnetic wire is increased to thereby reach the operational magnetic field. Thus, the magnetization direction of the soft layer of the magnetic wire is reversed, whereby a negative pulse is generated. When the magnetic field generation source is further rotated together with the rotating body, the magnetic flux directed from the first end to the second end of the magnetic wire is further increased to reach the stabilization magnetic field. Thus, the magnetization direction of the hard layer is also reversed, whereby the magnetic wire is brought into a set state for positive pulse generation. When the magnetic field generation source is further rotated, a magnetic flux directed from the second end to the first end of the magnetic wire is increased to reach the operational magnetic field. Thus, the magnetization direction of the soft layer of the magnetic wire is reversed, whereby a positive pulse is generated. When the magnetic field generation source is further rotated, the magnetic flux directed from the second end to the first end of the magnetic wire is further increased to thereby reach the stabilization magnetic field. Thus, the magnetization direction of the hard layer is also reversed, whereby the magnetic wire is brought into the set state for the negative pulse generation. When a single magnetic pole pair thus passes through the detection region of the power generation sensor, two pulses are generated.

Where the magnetic field generation source includes k magnetic pole pairs (wherein k≥2) disposed on the circle defined about the rotation axis with their N-poles and S-poles alternately arranged, a k-cycle alternating magnetic field per each turn of the rotating body is applied to the magnetic wire, whereby 2k pulses s are correspondingly generated.

5. In the multiturn n angle detection device according to Item 4, the magnetic wire of the power generation sensor is located on a tangential line of a circle defined about the rotation axis with its middle point located at a contact point on the tangential line.

With this arrangement, the magnetic field generation source can be properly magnetically coupled to the magnetic wire. Thus, the alternating magnetic field can be properly applied to the magnetic wire as the rotating body is rotated.

6. In the multiturn angle detection device according to Item 5, the power generation sensor includes a first magnetic flux conducting piece and a second magnetic flux conducting piece respectively magnetically coupled to the opposite ends of the magnetic wire.

With this arrangement, the first magnetic flux conducting piece is magnetically coupled to the first end of the magnetic wire, and the second magnetic flux conducting piece is magnetically coupled to the second end of the magnetic wire. Thus, the magnetic coupling between the magnetic field generation source and the magnetic wire can be strengthened, whereby a stronger magnetic field can be applied axially of the magnetic wire and the voltage pulses can be properly generated.

7. In the multiturn angle detection device according to any one of Items 4 to 6, the sensor element detects the polarity of any one of the magnetic poles opposed to the middle portion of the power generation sensor.

In this case, boundaries between the segments may each define an angular position such that one of the N-poles and the S-poles of the magnetic pole pairs is opposed to the middle portion of the power generation sensor. The boundaries between the segments are boundaries at which the count value of the segment counter is changed.

8. A segment counter which counts segments defined by dividing the single-turn cycle of a rotating body to be rotated about a rotation axis in an angular range over the single turn of the rotating body to generate a count value according to the rotation of the rotating body, the segment counter comprising:

a single power generation sensor;

a magnetic field generation source that is rotated together with the rotating body about the rotation axis;

a sensor element different from the power generation sensor;

a nonvolatile memory to store the count value; and a counter circuit to update the count value;

wherein the power generation sensor includes a magnetic wire that exhibits a large Barkhausen effect, and a coil wound around the magnetic wire, and generates a voltage pulse according to a magnetic field change occurring due to the rotation of the magnetic field generation source;

wherein the magnetic field generation source applies a two or more-cycle alternating magnetic field per each turn of the rotating body axially of the magnetic wire;

wherein, when the power generation sensor generates the voltage pulse, the counter circuit determines the rotation direction and the rotational position of the rotating body by using the polarity of the voltage pulse (hereinafter referred to as "new voltage pulse polarity"), an output state of the sensor element observed when the voltage pulse is generated (hereinafter referred to as "new sensor element state"), the polarity of a previous voltage pulse (hereinafter referred to as "previous voltage pulse polarity"), an output state of the sensor element observed when the previous voltage pulse is generated (hereinafter referred to as "previous sensor element state"), and a count value updated by the generation of the previous voltage pulse and stored in the nonvolatile memory (hereinafter referred to as "previous count value"), and updates the count value and stores the updated count value in the nonvolatile memory;

wherein the counter circuit updates the count value by:

determining the rotation direction of the rotating body based on a combination of the new voltage pulse polarity and the new sensor element state to determine a count amount sign;

setting a count amount absolute value to 1 if the new voltage pulse polarity is different from the previous voltage pulse polarity;

setting the count amount absolute value to 0 if the new voltage pulse polarity is the same as the previous voltage pulse polarity and the new sensor element state is the same as the previous sensor element state;

setting the count amount absolute value to 2 if the new voltage pulse polarity is the same as the previous voltage pulse polarity and the new sensor element state is different from the previous sensor element state; and prefixing the determined count amount sign to the count amount absolute value to provide a count amount, and adding the count amount to the previous count value.

The above and other objects, features and advantages of the present invention will become more apparent from the following description of the example embodiments with reference to the attached drawings.

BRIEF DESCRIPTION OF DRAWINGS

FIG. 2A is a perspective view that describes the structure of a segment counter by way of example, and FIG. 2B is a plan view of the segment counter. FIG. 2C is a front view of the segment counter as seen in an arrow direction IIC in FIG. 2B.

FIG. 5 is a table for describing the counting operation to be performed by the segment counter in greater detail by way of example.

DESCRIPTION OF EXAMPLE EMBODIMENTS

Figure 1:
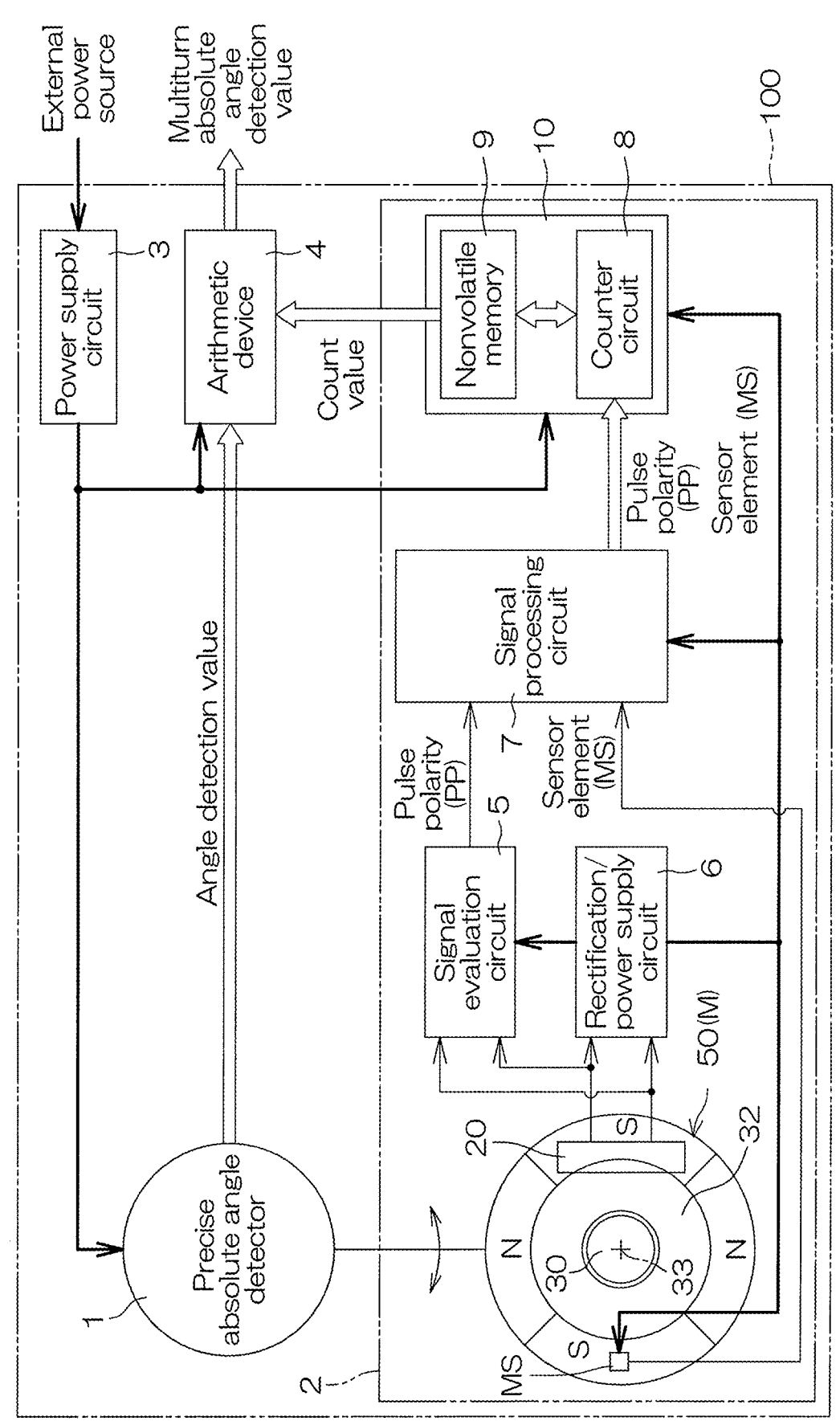
FIG. 1 is a block diagram that describes the configuration of a multiturn angle detection device according to one example embodiment of the present invention by way of example.

FIG. 1 is a block diagram that describes the configuration of a multiturn angle detection device according to one example embodiment of the present invention by way of example. The multiturn angle detection device 100 is a device that detects the multiturn absolute angle of a rotation shaft 30 (an example of the rotating body) to be rotated about a rotation axis 33, and generates a detection value as a multiturn absolute angle detection value. The multiturn absolute angle is an absolute angle in an angular range over one turn (i.e., in a multiturn angular range). The multiturn angle detection device 100 includes a precision absolute angle detector 1, a segment counter 2 and an arithmetic device 4.

The precision absolute angle detector 1 is an angle sensor that generates a precise absolute angle detection value within the single-turn cycle of the rotation shaft 30 (i.e., 0 degree to 360 degrees) at a resolution higher than that of the segment counter 2 to be described below. The precision absolute angle detector 1 is constituted, for example, by an optical absolute encoder. The precision absolute angle detector 1 is configured to generate an absolute angle detection value, for example, within an angular range of a single-turn cycle (0 degree to 360 degrees) at a resolution of 16 bits (65536 steps).

The precision absolute detector 1 is typically operative by receiving electric power supply from an external power source. Specifically, the multiturn angle detection device 100 includes a power supply circuit 3 connectable to the external power source. The power supply circuit 3 supplies electric power to the precision absolute angle detector 1 when being connected to the external power source, and the precision absolute angle detector 1 is operative by receiving the electric power. The precision absolute angle detector 1 inputs the 16-bit absolute angle detection value to the arithmetic device 4, for example, through serial communications.

The segment counter 2 counts segments defined by dividing (equally dividing) the single-turn cycle of the rotation shaft 30 as the rotation shaft 30 is rotated, and generates a count value indicating a segment-based angle value in an angular range of the multiple turns of the rotation shaft 30 (over one turn).

The segment counter 2 includes a single (sole) power generation sensor 20, a magnetic field generation source 50 to be rotated together with the rotation shaft 30 about the rotation axis 33, a sensor element MS different from the power generation sensor 20 (other than the power generation sensor), a counter circuit 8, and a nonvolatile memory 9 that stores the count value. The nonvolatile memory 9 may be constituted by a FeRAM (ferroelectric random access memory). In this example embodiment, the counter circuit 8 and the nonvolatile memory 9 are incorporated in a single counter memory IC (integrated circuit) 10. The segment counter 2 further includes a signal evaluation circuit 5, a rectification/power supply circuit 6 and a signal processing circuit 7.

The power generation sensor 20 generates a voltage pulse according to a magnetic field change occurring due to the rotation of the magnetic field generation source 50. In this example embodiment, the sensor element MS is a magnetic sensor that detects the magnetic field of the magnetic field generation source 50 according to the rotation of the magnetic field generation source 50. An example of the magnetic sensor is a Hall IC. The signal evaluation circuit 5 determines the polarity of the voltage pulse generated by the power generation sensor 20, and supplies a signal indicating the result of the determination of the polarity (pulse polarity PP) to the signal processing circuit 7. The signal processing circuit 7 converts the signal indicating the polarity determination result received from the signal evaluation circuit 5 into digital data (serial signal), and supplies the digital data as polarity determination data (pulse polarity PP) to the counter circuit 8. Further, the signal processing circuit 7 converts the output signal of the sensor element MS into digital data (serial signal), and supplies the digital data as magnetic detection data to the counter circuit 8.

The rectification/power supply circuit 6 rectifies the voltage pulse generated by the power generation sensor 20 to a proper voltage level, and supplies the resulting voltage pulse to the sensor element MS, the signal evaluation circuit 5, the signal processing circuit 7 and the counter memory IC 10 (the counter circuit 8 and the nonvolatile memory 9). Therefore, the sensor element MS, the signal evaluation circuit 5, the signal processing circuit 7 and the counter memory IC 10 (the counter circuit 8 and the nonvolatile memory 9) are operative without receiving the electric power supply from the external power source. That is, the segment counter 2 is operative with electric power generated by self-power generation even without the external electric power supply. The counter memory IC 10 is operative by receiving the electric power supply from the power supply circuit 3 when the power supply circuit 3 is connected to the external power source.

The counter circuit 8 incorporated in the counter memory IC 10 performs a counting operation based on the polarity determination data (pulse polarity PP) and the magnetic detection data (MS) supplied from the signal processing circuit 7 according to a predetermined counting logic. The counting operation is performed whether or not the electric power is supplied from the external power source through the power supply circuit 3. The count value is provided by the counting operation, and stored in the nonvolatile memory 9. The count value is kept stored even without the electric power supply (nonvolatile storage). The counter memory IC 10 supplies the count value from the nonvolatile memory 9 to the arithmetic device 4 through serial communications when the electric power is supplied from the external power source.

The arithmetic device 4 is operative by receiving the electric power supply from the power supply circuit 3 when the power supply circuit 3 is connected to the external power source. When the external power source is turned on, the arithmetic device 4 requests the precision absolute angle detector 1 to supply the precise absolute angle detection value, and requests the nonvolatile memory 9 to supply the count value. The precision absolute angle detector 1 supplies the precise absolute angle detection value to the arithmetic device 4 through serial communications. The nonvolatile memory 9 supplies the count value to the arithmetic device 4 through serial communications. The arithmetic device 4 combines the precise absolute angle detection value with the count value to generate the multiturn absolute angle detection value, and outputs the multiturn absolute angle detection value. The multiturn absolute angle detection value outputted from the arithmetic device 4 is supplied, for example, to an upper level controller (not shown), and is used for the rotation control of an electric motor and the like.

The arithmetic device 4 uses the count value supplied from the nonvolatile memory as it is, and combines the count value with the precise absolute angle detection value. That is, the count value to be used for the combining is a count value obtained by the segment counter 2 when the power supply is off. The arithmetic device 4 does not perform a correcting process for correction of an error in the count value, specifically, does not perform a synchronizing process or the like to correct the error in the count value and synchronize the count value with the precise absolute angle detection value.

FIG. 2A is a perspective view that describes the structure of the segment counter 2 by way of example, and FIG. 2B is a plan view of the segment counter 2. Further, FIG. 2C is a front view of the segment counter 2 as seen in an arrow direction IIC. The segment counter 2 includes the power generation sensor 20, the magnetic field generation source 50 and the sensor element MS (e.g., magnetic sensor).

The power generation sensor 20 is disposed on a first support 31, and supported by the first support 31. In this example embodiment, the sensor element MS is also mounted on the first support 31.

The magnetic field generation source 50 is fixed to a second support 32. The second support 32 is movable relative to the first support 31. Specifically, the second support 32 is coupled to (fixed to) the rotation shaft 30, and is rotatable together with the rotation shaft 30 about the rotation axis 33. Therefore, the second support 32 may be a part of the rotating body. In contrast, the first support 31 is stationary to be held in a nonrotatable state. Thus, the magnetic field generation source 50 is rotatable together with the second support 32 about the rotation axis 33 to be thereby moved relative to the first support 31.

The rotation shaft 30 is typically rotated by a driving force applied from the drive shaft of the electric motor (not shown). Where the electric motor is driven in opposite directions, the rotation shaft 30 is correspondingly rotated in a counterclockwise direction CCW and in a clockwise direction CW. The first support 31 may be a printed wiring board disposed in a plane orthogonal to the rotation axis 33.

The magnetic field generation source 50 is constituted by a ring-shaped four-pole magnetization magnet M surrounding the rotation axis 33. The magnetization direction is parallel to the rotation axis 33. The four-pole magnetization magnet M includes k N-poles n1, n2, . . . , nk and k S-poles s1, s2, . . . , sk (wherein k is an integer not smaller than 2 and, in the illustrated example, k=2), and is configured so that k magnetic pole pairs (k pairs of N-poles and S-poles) are disposed circumferentially about the rotation axis 33 with their N-poles and S-poles alternately arranged as seen along the rotation axis 33 from one side. The magnetic poles n1, n2, . . . , nk; s1, s2, . . . , sk respectively extend in angular ranges defined about the rotation axis 33 as each having an angle of 360 degrees/2k (90 degrees in this example embodiment). Where the second support 32 is rotated together with the rotation shaft 30 and the magnetic field is generation source 50 correspondingly rotated about the rotation axis 33, therefore, a k-cycle alternating magnetic field (two-cycle alternating magnetic field in the illustrated example) is applied to the power generation sensor 20.

The power generation sensor 20 is mounted on one of the major surfaces of the first support 31 (printed wiring board). The power generation sensor 20 includes a magnetic wire FE, and a first magnetic flux conducting piece FL1 and a second magnetic flux conducting piece FL2 respectively magnetically coupled to the opposite ends of the magnetic wire FE. A coil SP (induction coil) is wound around the magnetic wire FE between the first magnetic flux conducting piece FL1 and the second magnetic flux conducting piece FL2. The first magnetic flux conducting piece FL1 and the second magnetic flux conducting piece FL2 are magnetically soft components having substantially the same shape and substantially the same size. More specifically, the first magnetic flux conducting piece FL1 and the second magnetic flux conducting piece FL2 are configured symmetrically with respect to a symmetry plane 27 (a virtual plane to be used to describe the geometrical layout) extending orthogonally to an axis direction x through the axially middle point 25 of the magnetic wire FE (hereinafter referred to simply as "axially middle point 25").

The magnetic wire FE is configured to exhibit the large Barkhausen effect. Specifically, the magnetic wire FE has a core portion, and a shell portion covering the core portion. One of the core portion and the shell portion is a soft layer (magnetically soft layer) in which its magnetization direction is reversed even by application of a weak magnetic field, and the other of the core portion and the shell portion is a hard layer (magnetically hard layer) in which its magnetization direction is reversed only by application of a strong magnetic field.

The magnetic flux conducting pieces FL1, FL2 respectively have magnetic flux conducting ends 21, 22 opposed to a detection region SR. The magnetic wire FE of the power generation sensor 20 is located on a tangential line of a circle defined about the rotation axis 33, and the axially middle point 25 of the magnetic wire FE is present on the contact point of the tangential line. The power generation sensor 20 is disposed so that, when the middle portion of any one of the magnetic poles n1, n2, . . . , nk; s1, s2, . . . , sk extending in the angular ranges defined about the rotation axis 33 and each having an angle of 360 degrees/2k (90 degrees in this example embodiment) coincides with the axially middle point 25 of the magnetic wire FE, magnetic fluxes conducted through the two magnetic flux conducting pieces FL1, FL2 are balanced with each other. The coil SP generates a negative voltage pulse in a first state in which a magnetic flux from the N-pole n1, n2, . . . , nk is conducted through the first magnetic flux conducting piece FL1, and generates a positive voltage pulse in a second state in which the magnetic flux from the N-pole n1, n2, . . . , nk is conducted through the second magnetic flux conducting piece FL2.

In this example embodiment, the first magnetic flux conducting piece FL1 and the second magnetic flux conducting piece FL2 respectively have axis-orthogonal portions 41 extending parallel to each other from the opposite ends of the magnetic wire FE orthogonally to the axis direction x, and axis-parallel portions 42 respectively extending toward each other from the distal end portions of the axis-orthogonal portions 41 in the axis direction x. The opposite ends of the magnetic wire FE are respectively fixed to the proximal portions of the axis-orthogonal portions 41 of the first magnetic flux conducting piece FL1 and the second magnetic flux conducting piece FL2. More specifically, the proximal portions of the axis-orthogonal portions 41 each include a wire placement portion 23 formed with a hole or a groove extending therethrough in the axis direction x. The opposite end portions of the magnetic wire FE respectively extend through the wire placement portions 23 of the axis-orthogonal portions 41 of the first magnetic flux conducting piece FL1 and the second magnetic flux conducting piece FL2, and are respectively fixed to the axis-orthogonal portions 41. The magnetic wire FE is connected and fixed to the first magnetic flux conducting piece FL1 and the second magnetic flux conducting piece FL2, for example, by resin portions (not shown) each provided in the hole or the groove of the wire placement portion 23. Thus, the opposite end portions of the magnetic wire FE are respectively magnetically coupled to the first magnetic flux conducting piece FL1 and the second magnetic flux conducting piece FL2.

The power generation sensor 20 is configured so that a region opposite from the magnetic wire FE with respect to the axis-parallel portions 42 is defined as the detection region SR for the detection of a magnetic field.

The magnetic flux conducting pieces FL1, FL2 each composed of the magnetically soft component each include the axis-orthogonal portion 41 (having a generally parallelepiped shape) and the axis-parallel portion 42 (having a generally parallelepiped shape) connected to the distal end portion of the axis-orthogonal portion 41 adjacent to the detection region SR, and each have an L-shape bent at a right angle at a connection portion between the axis-orthogonal portion 41 and the axis-parallel portion 42. The axis-parallel portions 42 extend in the axis direction x so as to shield the magnetic wire FE, i.e., so as to shield the magnetic wire FE from the detection region SR. The first magnetic flux conducting piece FL1 and the second magnetic flux conducting piece FL2, which are symmetrically configured, extend toward the axially middle portion of the magnetic wire FE, and the adjacent ends 42a of the first magnetic flux conducting piece FL1 and the second magnetic flux conducting piece FL2 are opposed to each other with a gap defined therebetween around the axially middle point 25 of the magnetic wire FE. The adjacent ends 42a each have a surface extending orthogonally to the axis direction x, and the two surfaces of the two adjacent ends 42a are parallel to each other and opposed to each other in the axis direction x.

The magnetic flux conducting ends 21, 22 of the axis-parallel portions 42 of the first magnetic flux conducting piece FL1 and the second magnetic flux conducting piece FL2 respectively serve as detection region opposition surfaces opposed to the detection region SR. The magnetic flux conducting ends 21, 22 (detection region opposition surfaces) are planar surfaces parallel to the axis direction x. When any one of the magnetic poles is located in the detection region SR, the magnetic flux conducting ends 21, 22 (detection region opposition surfaces) guide a magnetic flux from that magnetic pole into the first magnetic flux conducting piece FL1 and the second magnetic flux conducting piece FL2.

The axis-parallel portions 42 of the first magnetic flux conducting piece FL1 and the second magnetic flux conducting piece FL2 are joined with a wiring pattern (not shown) formed on the one major surface of the first support 31 (printed wiring board), whereby the power generation sensor 20 is surface-mounted on the first support 31 (printed wiring board). The power generation sensor 20 is disposed so that the axis direction x of the magnetic wire FE extends along the tangential line of the circle defined about the rotation axis 33 through the point (contact point) present on the circle, and the axially middle point 25 of the magnetic wire FE coincides with the contact point. The detection region SR of the power generation sensor 20 is located on a side of the axis-parallel portions 42 opposite from the magnetic wire FE and, in this example, is a region adjacent to the other major surface of the first support 31 (printed wiring board).

In this example, the second support 32 is configured in an annular shape surrounding the rotation axis 33. More specifically, the second support 32 is constituted by an annular plate, and is disposed in a plane orthogonal to the rotation axis 33 and parallel to the first support 31 (printed wiring board). The magnet M is fixed to a surface of the second support 32 opposed to the other major surface of the first support 31 (printed wiring board). In this example embodiment, the magnetic poles n1, s1, n2, s2, . . . , nk, sk of the magnet M are arranged circumferentially equidistantly about the rotation axis 33. In the illustrated specific example, four magnetic poles n1, s1, n2, s2 are arranged at an angular interval of 90 degrees about the rotation axis 33, and the magnet M is fixed to the second support 32 so that the magnetic poles n1, s1, n2, s2 are opposed to the first support 31 (printed wiring board). Distances from the rotation axis 33 to the middle portions of the magnetic poles n1, s1, n2, s2, . . . , nk, sk may be each equal to a distance from the rotation axis 33 to the axially middle point 25 of the magnetic wire FE. That is, the magnetic wire FE and the magnetic poles n1, s1, n2, s2, . . . , nk, sk are located on the same radius circle defined about the rotation axis 33, in plan view along the rotation axis 33, to be thereby arranged in a positional relationship such that the magnetic poles n1, s1, n2, s2, . . . , nk, sk can be opposed to the magnetic wire FE in a direction parallel to the rotation axis 33. The second support 32 is preferably a yoke composed of a magnetically soft component.

As the second support 32 is rotated together with the rotation shaft 30 about the rotation axis 33, the magnetic poles n1, s1, n2, s2, . . . , nk, sk are moved on a circular track 55 extending through the detection region SR about the rotation axis 33. The axis direction x of the magnetic wire FE is parallel to a tangential line of the circular track 55 extending through a certain point (contact point) present on the circular track 55, and the axially middle point 25 is present on a perpendicular line extending through the contact point perpendicularly to the tangential line (in this example, a perpendicular line parallel to the rotation axis 33). In other words, the axially middle point 25 of the magnetic wire FE is located at a certain point (contact point) present on a circle defined about the rotation axis 33 and having the same radius as the circular track 55, and the magnetic wire FE extends along a tangential line of the circle extending through the contact point.

A distance between the first support 31 and the second support 32 as measured along the rotation axis 33 is set to a suitable value that permits the magnetic poles n1, s1, n2, s2, . . . , nk, sk to enter the detection region SR of the power generation sensor 20 by the rotation of the second support 32.

The sensor element MS (e.g., magnetic sensor) is also mounted on the major surface of the first support 31 (printed wiring board) mounted with the power generation sensor 20. The sensor element MS is disposed so as to detect the polarity of any one of the magnetic poles opposed to the middle portion of the power generation sensor 20. The sensor element MS is, for example, a magnetic sensor such as a Hall IC. The sensor element MS is configured to output an H-signal when detecting any one of the N-poles (when the N-pole opposes to the middle portion of the power generation sensor 20) and to output an L-signal when detecting any one of the S-poles (when the S-pole opposes to the middle portion of the power generation sensor 20). Thus, the sensor element MS determines the polarity of the magnetic pole passing through the vicinity of the sensor element MS and, as a result, outputs an identification signal indicating the polarity of the magnetic pole opposed to the middle portion of the power generation sensor 20. In this example embodiment, the sensor element MS is disposed so as to detect one of the magnetic poles at a position having a phase difference of 180 degrees about the rotation axis 33 with respect to the power generation sensor 20, i.e., at a position symmetrical to the power generation sensor 20 about the rotation axis 33. Where k is an even number (e.g., 2), the sensor element MS detects a magnetic pole having the same polarity as that of the magnetic pole opposed to the middle portion of the power generation sensor 20. Where k is an odd number (e.g., 3), the sensor element MS detects a magnetic pole having a polarity opposite to that of the magnetic pole opposed to the middle portion of the power generation sensor 20. In either case, the sensor element MS can detect the polarity of the magnetic pole opposed to the middle portion of the power generation sensor 20.

With this arrangement, one negative pulse and one positive pulse are sequentially generated, every time one magnetic pole pair n1, s1; n2, s2; . . . ; nk, sk passes through the detection region SR along the circular track 55 by the rotation about the rotation axis 33 in the counterclockwise direction CCW. Further, one positive pulse and one negative pulse are sequentially generated, every time one magnetic pole pair n1, s1; n2, s2; . . . ; nk, sk passes through the detection region SR along the circular track 55 by the rotation about the rotation axis 33 in the clockwise direction CW. The rotational position and the rotation direction can be detected based on these pulses and the identification signal (indicating the polarity of the magnetic pole located on the circular track 55 between the first magnetic flux conducting piece FL1 and the second magnetic flux conducting piece FL2) outputted by the sensor element MS.

Figure 3A:
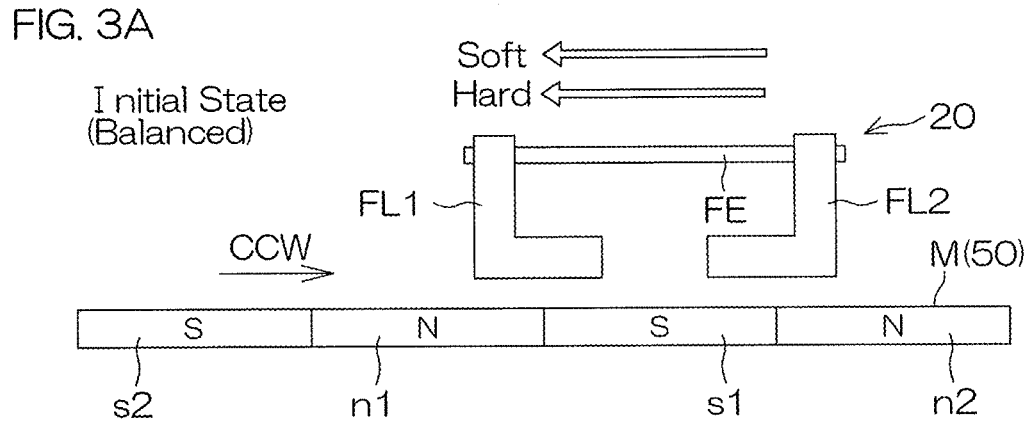
FIGS. 3A, 3B and 3C are operation diagrams for describing the function of a power generation sensor.

FIGS. 3A to 3F show an exemplary operation. Consideration will be given to a case in which the rotation shaft 30 is rotated about the rotation axis 33 in the counterclockwise direction CCW (counterclockwise). FIG. 3A is an operation diagram showing the state of FIG. 2B as seen in an arrow direction IIC. FIGS. 3B to 3F are operation diagrams as seen in the same aspect. In FIGS. 3A to 3F, the magnetic poles are shown as expanded linearly for description.

When a state shown in FIG. 3A (FIG. 2B) is reached, the hard layer and the soft layer of the magnetic wire FE are magnetized in a direction extending from the second magnetic flux conducting piece FL2 to the first magnetic flux conducting piece FL1, i.e., set state for the negative pulse generation (SET_N) is achieved. At this time, the areas of the first magnetic flux conducting piece FL1 opposed to the N-pole and the S-pole are balanced with the areas of the second magnetic flux conducting piece FL2 opposed to the N-pole and the S-pole. In other words, the magnetic field generation source 50, the power generation sensor 20 and the positional relationship of the magnetic field generation source 50 and the power generation sensor 20 are designed so as to achieve such a state.

Figure 3B:
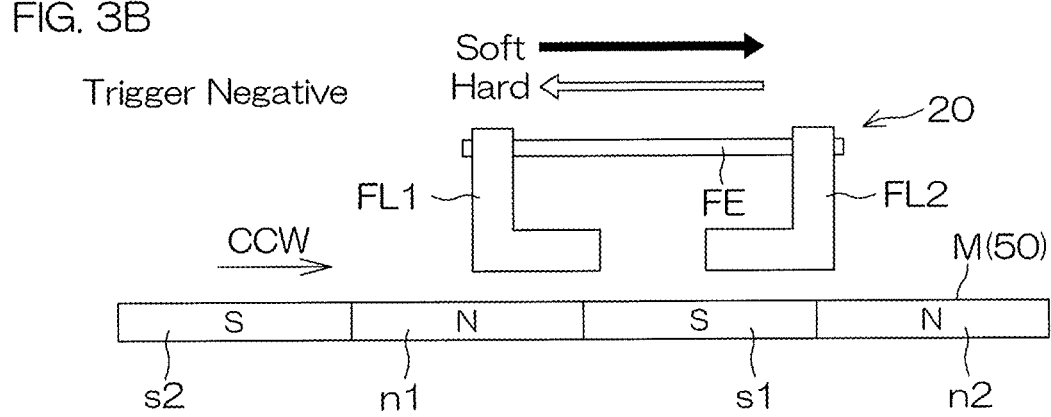

When the magnetic field generation source 50 is slightly rotated together with the rotation shaft 30 in the counterclockwise direction CCW from this state, the proportion of the area of the first magnetic flux conducting piece FL1 opposed to the N-pole is increased, and the proportion of the area of the second magnetic flux conducting piece FL2 opposed to the N-pole is reduced as shown in FIG. 3B. Thus, a magnetic field directed from the first magnetic flux conducting piece FL1 to the second magnetic flux conducting piece FL2 is applied to the magnetic wire FE. When the strength of the magnetic field reaches the operational magnetic field, the magnetization direction of the soft layer is reversed, whereby a negative voltage pulse is generated. At this time, the sensor element MS detects the S-pole (the S-pole is opposed to the middle portion of the power generation sensor 20), so that an L-signal is generated.

Figure 3C:
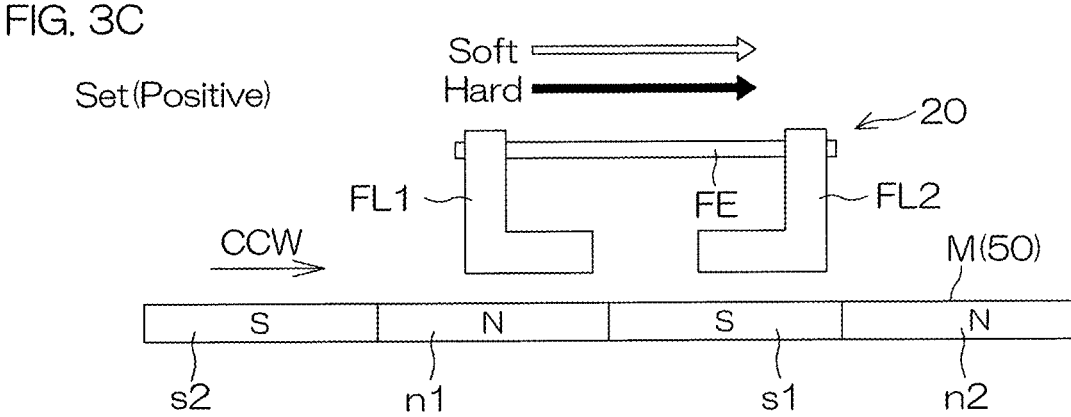

When the rotation shaft 30 is further rotated in the counterclockwise direction CCW, the magnetic field directed from the first magnetic flux conducting piece FL1 to the second magnetic flux conducting piece FL2 is strengthened to reach the stabilization magnetic field, whereby the magnetization direction of the hard layer of the magnetic wire FE is also reversed as shown in FIG. 3C to achieve a set state for the positive pulse generation (SET_P).

Figure 3D:
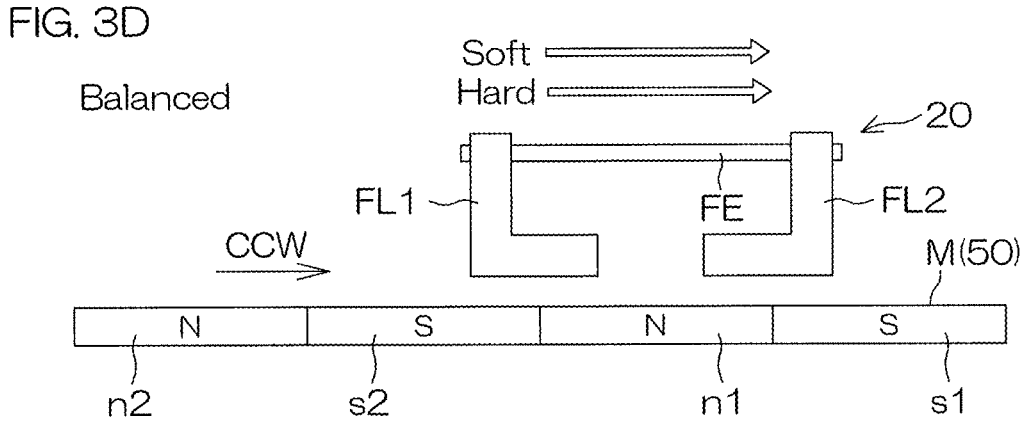
FIGS. 3D, 3E and 3F are operation diagrams for describing the function of the power generation sensor.

When the rotation shaft 30 is further rotated by 90 degrees in the counterclockwise direction CCW from the state shown in FIG. 3C to a state shown in FIG. 3D, the power generation sensor 20 operates in substantially the same manner as described above with the polarity reversed. That is, the hard layer and the soft layer of the magnetic wire FE are magnetized in the direction extending from the first magnetic flux conducting piece FL1 to the second magnetic flux conducting piece FL2, i.e., the set state for the positive pulse generation (SET_P) is achieved. At this time, the areas of the first magnetic flux conducting piece FL1 opposed to the N-pole and the S-pole are balanced with the areas of the second magnetic flux conducting piece FL2 opposed to the N-pole and the S-pole.

Figure 3E:
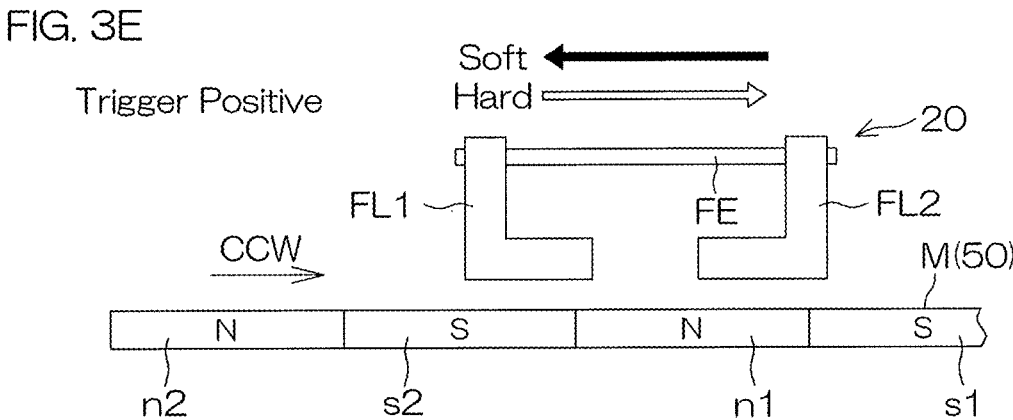

When the magnetic field generation source 50 is slightly rotated together with the rotation shaft 30 in the counterclockwise direction CCW from this state, as shown in FIG. 3E, the proportion of the area of the first magnetic flux conducting piece FL1 opposed to the N-pole is reduced, and the proportion of the area of the second magnetic flux conducting piece FL2 opposed to the N-pole is increased. Thus, a magnetic field directed from the second magnetic flux conducting piece FL2 to the first magnetic flux conducting piece FL1 is applied to the magnetic wire FE. When the strength of the magnetic field reaches the operational magnetic field, the magnetization direction of the soft layer is reversed, whereby a positive voltage pulse is generated. At this time, the sensor element MS detects the N-pole (the N-pole is opposed to the middle portion of the power generation sensor 20), so that an H-signal is generated.

Figure 3F:
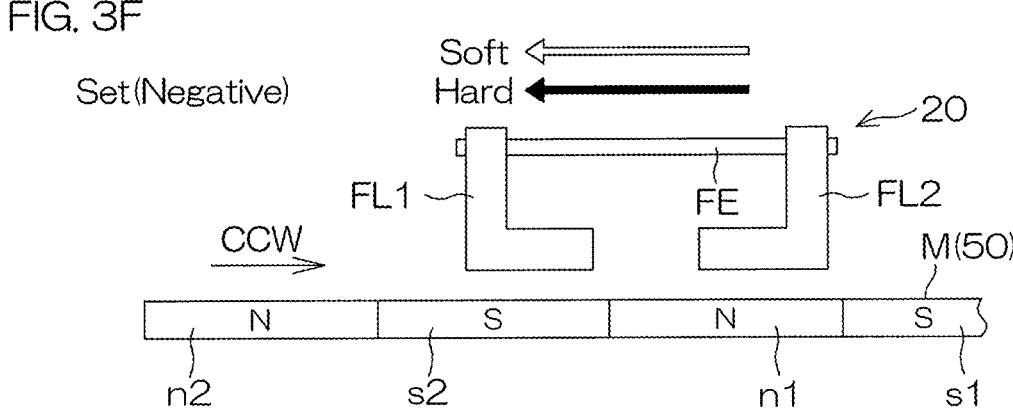

When the rotation shaft 30 is further rotated in the counterclockwise direction CCW, the magnetic field directed from the second magnetic flux conducting piece FL2 to the first magnetic flux conducting piece FL1 is strengthened to reach the stabilization magnetic field, whereby the magnetization direction of the hard layer of the magnetic wire FE is also reversed as shown in FIG. 3F to achieve the set state for the negative pulse generation (SET_N). When the rotation shaft 30 is further rotated in the counterclockwise direction CCW from this state, a state equivalent to that shown in FIG. 3A is achieved.

When one magnetic pole pair thus passes through the detection region of the power generation sensor 20, the two pulses are generated. Since the magnetic field generation source 50 includes the k magnetic pole pairs (the two magnetic pole pairs in this example), 2k pulses (four pulses in this example) are generated per each turn.

Figure 4:
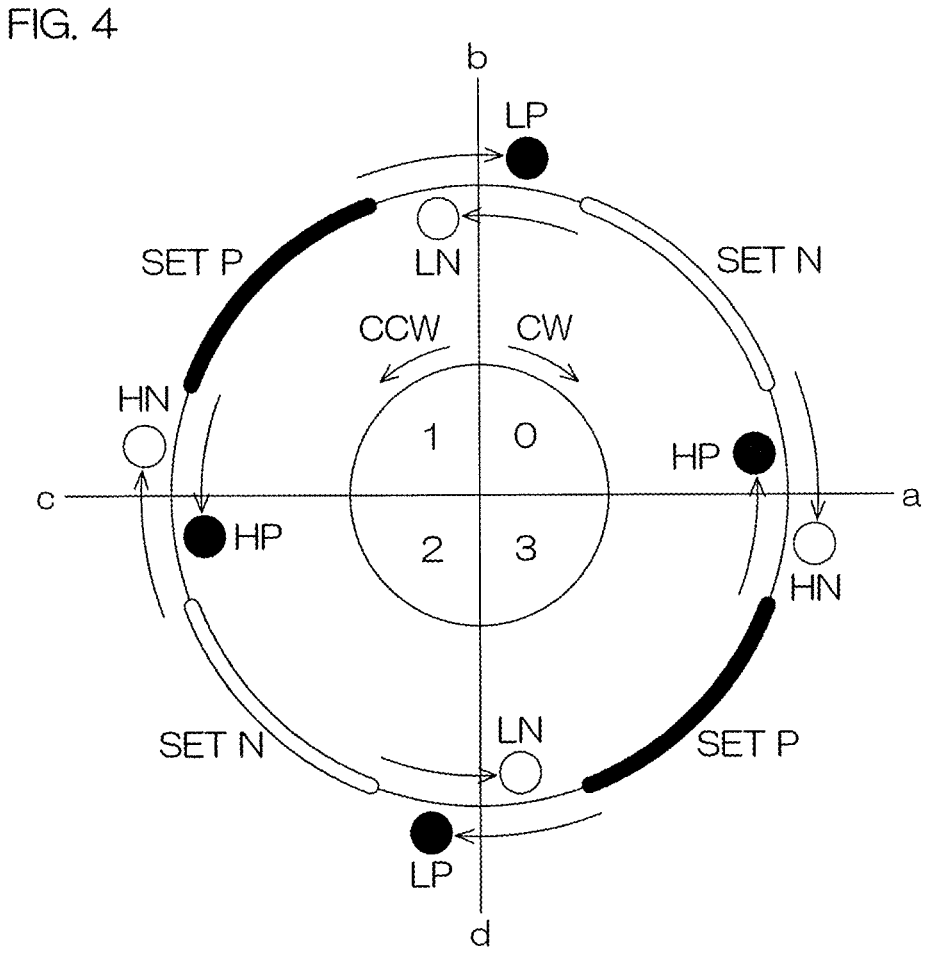
FIG. 4 is a diagram for describing a counting operation to be performed by the segment counter.

FIG. 4 is a diagram for describing an operation to be performed by the segment counter 2. In this example embodiment, the segment counter 2 counts segments defined by dividing an angular range about the rotation axis 33 into $U_m$ (wherein $U_m$ is an integer not smaller than 4), and generates a count value indicating the result of the counting. The segments correspond to the magnetic poles n1, s1, n2, s2, . . . , nk, sk. Typically, the magnetic poles n1, s1, n2, s2, . . . , nk, sk are respectively provided (magnetized) in regions defined by equiangularly dividing the angular range about the rotation axis 33, and the segments correspond to the regions defined by equally dividing the angular range about the rotation axis 33. In the example shown in FIG. 4, $U_m=4$. Four segments are defined by four boundaries a, b, c, d set at an angular interval of 90 degrees about the rotation axis 33. The count value of the segment counter 2 is changed in response to a voltage pulse generated by the power generation sensor 20 at the boundaries a, b, c, d. Specifically, the boundaries a, b, c, d each define an angular position at which a corresponding one of the magnetic poles is opposed to the middle portion of the power generation sensor 20. Description will be given, for example, to a case in which the segment counter 2 counts up when any one of the magnetic poles is moved in the counterclockwise direction CCW across the position at which the one magnetic pole is opposed to the middle portion of the power generation sensor 20, and counts down when any one of the magnetic poles is moved in the clockwise direction CW across the position at which the one magnetic pole is opposed to the middle portion of the power generation sensor 20.

Where the magnetic poles n1, s1, n2, s2 are arranged circumferentially equidistantly, the boundary a, the boundary b, the boundary c and the boundary d are arranged at a rotation angle interval of 90 degrees. Where the boundary a is present at a reference angle of 0 degree, the boundary b is present at an angle of 90 degrees and the boundary c is present at an angle of 180 degrees. Further, the boundary d is present at an angle of 270 degrees. In this example embodiment, the segment counter 2 is designed so as to count up when the rotation angle is moved across the boundary a, b, c, d in the counterclockwise direction CCW, and to count down when the rotation angle is moved across the boundary a, b, c, d in the clockwise direction CW. In the following description, accordingly, an angle value defined about the rotation axis 33 increases as measured in the counterclockwise direction CCW with reference to the boundary a.

The magnetic field generation source 50 is configured to generate a k-cycle alternating magnetic field (k=2 in the illustrated example) while the rotation shaft 30 makes one turn about the rotation axis 33. In this example embodiment, more specifically, the 2k magnetic poles n1, s1, n2, s2, . . . , nk, sk are arranged equiangularly about the rotation axis 33.

The meanings of characters shown in FIG. 4 are as follows. "H" is a state value indicating a state such that the sensor element MS detects any one of the N-poles n1, n2, . . . , nk, i.e., a state such that any one of the N-poles n1, n2, . . . , nk is opposed to the middle portion of the power generation sensor 20. "L" is a state value indicating a state such that the sensor element MS detects any one of the S-poles s1, s2, . . . , sk, i.e., a state such that any one of the S-poles s1, s2, . . . , sk is opposed to the middle portion of the power generation sensor 20. These state values correspond to the magnetic detection data generated based on the output of the sensor element MS by the signal processing circuit 7. "P" is a pulse polarity value indicating the generation of the positive pulse by the power generation sensor 20. "N" is a pulse polarity value indicating the generation of the negative pulse by the power generation sensor 20. These pulse polarity values correspond to the polarity determination data generated based on the output of the signal evaluation circuit 5 by the signal processing circuit 7.

A state value to be supplied from the signal processing circuit 7 to the counter circuit 8 is represented by a combination of the aforementioned values, and is updated and stored in the nonvolatile memory 9 every time the power generation sensor 20 generates a pulse. "HP" is a state value indicating a state such that a positive pulse is generated with any one of the N-poles n1, n2, . . . , nk opposed to the middle portion of the power generation sensor 20. "LN" is a state value indicating a state such that a negative pulse is generated with any one of the S-poles s1, s2, . . . , sk opposed to the middle portion of the power generation sensor 20. "HN" is a state value indicating a state such that a negative pulse is generated with any one of the N-poles opposed to the middle portion of the power generation sensor 20. "LP" is a state value indicating a state such that a positive pulse is generated with any one of the S-poles opposed to the middle portion of the power generation sensor 20.

"SET_P" indicates an angular range for the preparatory state (set state) for the positive pulse generation. "SET_N" indicates an angular range for the preparatory state (set state) for the negative pulse generation.

Basic operations to be performed by the segment counter 2 are as follows:

When the rotation shaft 30 is rotated in the counterclockwise direction CCW, one positive pulse or one negative pulse is generated around the boundaries a, b, c, d corresponding to rotation angles of 0 degree, 90 degrees, 180 degrees and 270 degrees by the operation of the power generation sensor 20 shown in FIGS. 3A to 3F. At this time, the state is circularly changed as follows: the set state SET_P→the state value HP (positive pulse generation)→the set state SET_N→the state value LN (negative pulse generation)→the set state SET_P→ . . . . The segment counter 2 counts up by +1 with the state values HP and LN. That is, the segment counter 2 counts up by +1 when the rotation angle is increased over 0 degree (at the boundary a), 90 degrees (at the boundary b), 180 degrees (at the boundary c) and 270 degrees (at the boundary d).

When the rotation shaft 30 is rotated in the clockwise direction CW, the operation of the power generation sensor 20 is such that the movement direction of the magnetic poles is reversed from that shown in FIGS. 3A to 3F around the boundaries a, b, c, d corresponding to rotation angles of 0 degree, 90 degrees, 180 degrees and 270 degrees. Thus, one positive pulse or one negative pulse is generated. At this time, the state is circularly changed as follows: the set state SET_N→the state value HN (negative pulse generation)→ the set state SET_P→the state value LP (positive pulse generation)→the set state SET_N→ . . . . The segment counter 2 counts down by –1 with the state values HN and LP. That is, the segment counter 2 counts down by –1 when the rotation angle is reduced below 0 degree (at the boundary a), 90 degrees (at the boundary b), 180 degrees (at the boundary c) and 270 degrees (at the boundary d).

FIG. 5 is a table for describing the counting operation to be performed by the segment counter 2 in greater detail by way of example. The counter circuit 8 incorporated in the counter memory IC 10 performs the counting operation according to the logic based on the table. When the power generation sensor 20 generates a pulse, the state value inputted to the counter circuit 8 from the signal processing circuit is updated. The counting operation (counter operation) is determined by a combination of the updated state value (NEW: current value) and the preceding state value (OLD: previous value). The counter circuit 8 reads out the preceding state value (OLD) from the nonvolatile memory 9, and performs the counting operation by using the preceding state value.

When the updated state value is HP, a +1 counting-up operation is performed if the preceding state value is LN or HN (i.e., if the pulses are different in polarity). When the updated state value is HN, a –1 counting-down operation is performed if the preceding state value is LP or HP (i.e., if the pulses are different in polarity).

When the updated state value is LP, the –1 counting-down operation is performed if the preceding state value is HN or LN (i.e., if the pulses are different in polarity). When the updated state value is LN, the +1 counting-up operation is performed if the preceding state value is HP or LP (i.e., if the pulses are different in polarity).

The counting operations described above are basic counting operations. Additionally, exceptional counting operations are performed for compensation for the influence of pulse missing to be described later. Specifically, when the updated state value is equal to the preceding state value, the count value is kept unchanged (a count value change is 0). Further, if the preceding state value is LP when the updated state value is HP (i.e., if the voltage pulses have the same polarity and the polarities of the magnetic poles detected by the sensor element MS are different), a +2 counting operation is performed. If the preceding state value is LN when the updated state value is HN (i.e., if the voltage pulses have the same polarity and the polarities of the magnetic poles detected by the sensor element MS are different), a –2 counting operation is performed. If the preceding state value is HP when the updated state value is LP (i.e., if the voltage pulses have the same polarity and the polarities of the magnetic poles detected by the sensor element MS are different), the –2 counting operation is performed. If the preceding state value is HN when the updated state value is LN (i.e., if the voltage pulses have the same polarity and the polarities of the magnetic poles detected by the sensor element MS are different), the +2 counting operation is performed.

Thus, the counter circuit 8 operates to determine the rotation direction and the rotational position of the rotation shaft 30 based on the state value, i.e., by using the output signal of the sensor element MS and the voltage pulse generated by the power generation sensor 20, and to update the count value and write the updated count value in the nonvolatile memory 9.

The operation of the counter circuit 8 is summarized as follows.

Step 1 (determination of rotation direction): The rotation direction is determined based on a combination of the new voltage pulse polarity and the new sensor element state (here, the polarity of the magnetic pole detected by the sensor element MS) to determine a count amount sign. For example, the state value H of the sensor element MS is represented as +1, and the state value L of the sensor element MS is represented as –1. Further, the pulse polarity value P is represented as +1, and the pulse polarity value N is represented as –1. Then, the product of the pulse polarity value and the sensor element state value is +1 or –1, which is a rotation direction value indicating the rotation direction. That is, for the state values HP and LN, the rotation direction value is +1, which indicates that the direction is rotation the counterclockwise direction CCW (see FIG. 4). Further, for the state values HN and LP, the rotation direction value is –1, which indicates that the rotation direction is the clockwise direction CW. The signs of these rotation direction values are each employed as the count amount sign. It is obvious that the signs are not necessarily prefixed in the aforementioned manner. Different signs are prefixed to the two sensor element state values, and different signs are prefixed to the two pulse polarity values. Then, the sign of the product of the sensor element state value and the pulse polarity value indicates the rotation direction.

Step 2 (count amount absolute value): Where the new voltage pulse polarity and the previous voltage pulse polarity are different from each other, the count amount absolute value is set to 1. Where the new voltage pulse polarity and the previous voltage pulse polarity are the same and the new sensor element state and the previous sensor element state are the same, the count amount absolute value is set to 0. Where the new voltage pulse polarity and the previous voltage pulse polarity are the same and the new sensor element state and the previous sensor element state are different from each other, the count amount absolute value is set to 2.

Step 3 (count amount): The count amount is determined by prefixing the determined sign (Step 1) to the count amount absolute value (Step 2).

Step 4 (update of count value): The count value is updated by adding the determined count amount (Step 3) to the previous count value.

The order of Steps 1 and 2 may be changed, or Steps 1 and 2 may be simultaneously performed. Further, the table shown in FIG. 5 may be prepared in advance, and the count amount may be determined with the use of the table. In this case, Steps 1, 2 and 3 are virtually simultaneously performed.

Figure 6:
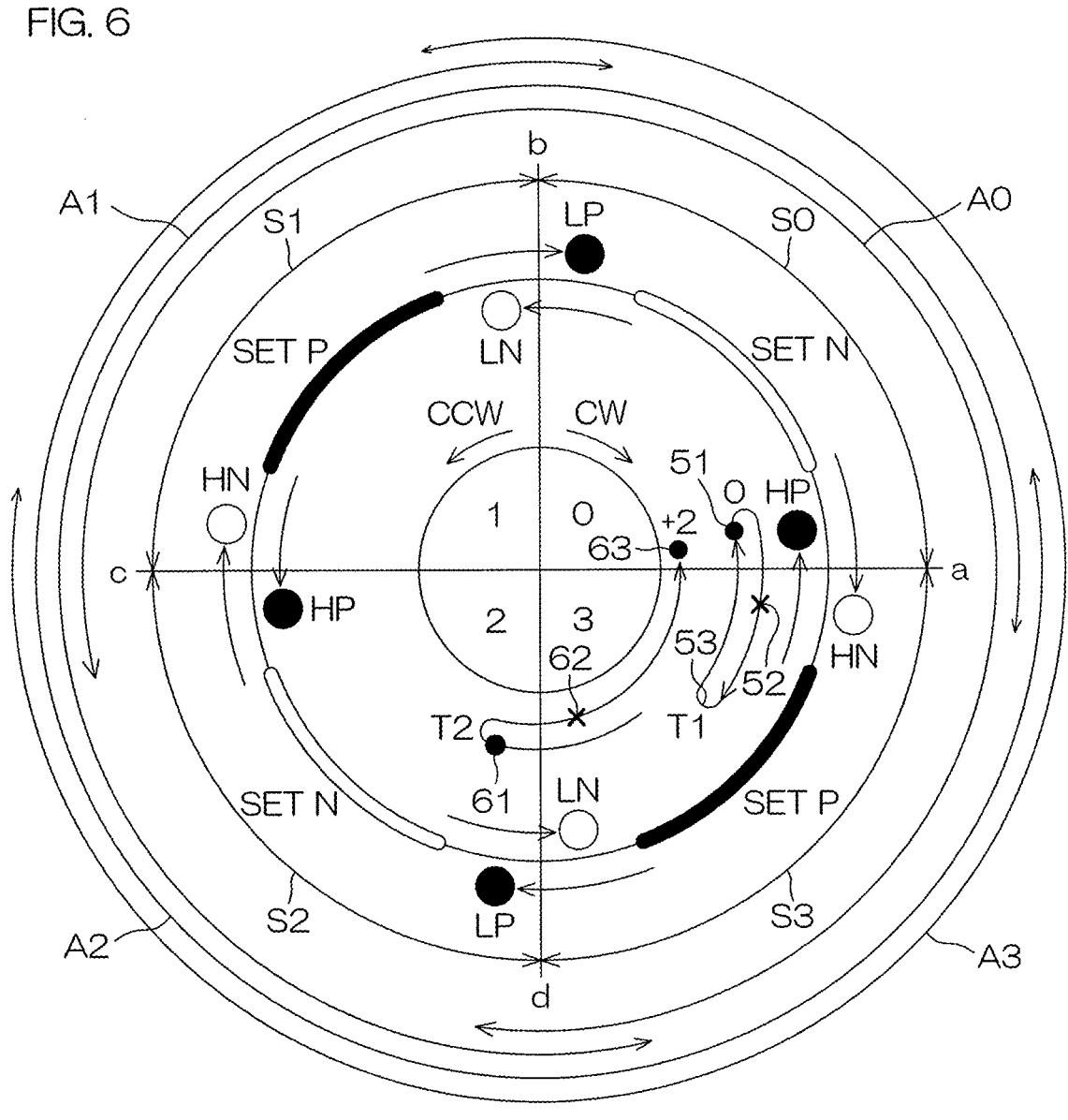
FIG. 6 is a diagram for describing how pulse missing influences a count value.

FIG. 6 is a diagram for describing how the pulse missing influences the count value.

Consideration will be given to a case in which the rotation angle is moved along a path T1. If the rotation angle is moved across the boundary a in the counterclockwise direction CCW whereby a positive pulse is generated at a position 51, the state value is changed to HP (see FIG. 3E). If the rotation direction is reversed before the rotation angle reaches a position (see FIG. 3F) at which the stabilization magnetic field is applied to the magnetic wire FE of the power generation sensor 20, the magnetic wire FE is not brought into the negative pulse generation preparatory state (SET_N) but the rotation angle is moved across the boundary a in the clockwise direction CW to reach a position 52 at which the state value is to be changed to HN. At this time, no negative pulse is generated at the position 52 (pulse missing) and, therefore, the state value is not updated. Thereafter, the magnetic wire FE is brought into the positive pulse generation preparatory state (SET_P) by further rotation in the clockwise direction CW. If the rotation direction is thereafter reversed into the counterclockwise direction CCW at a position 53 and the rotation angle is moved across the boundary a again before the rotation angle reaches the boundary d, a positive pulse is generated again at the position 51. Therefore, a state value change is HP→HP, so that the count value is kept unchanged (see FIG. 5). Where the rotation direction is opposite to that described above, a similar behavior is observed. Therefore, the count value may contain an error of +1 during such behavior.

Next, consideration will be given to a case in which the rotation angle is moved along a path T2. That is, the rotation angle is moved across the boundary d in the clockwise direction CW, whereby a positive pulse is generated at a position 61 and the state value is changed to LP. If the rotation direction is reversed before the rotation angle reaches a position (see FIG. 3F) at which the stabilization magnetic field is applied to the magnetic wire FE of the power generation sensor 20, the magnetic wire FE is not brought into the negative pulse generation preparatory state (SET_N) but the rotation angle is moved across the boundary d in the counterclockwise direction CCW to reach a position 62 at which the state value is to be changed to LN. At this time, no negative pulse is generated at the position 62 (pulse missing), so that the state value is not updated. Thereafter, the magnetic wire FE is brought into the positive pulse generation preparatory state (SET_P) by further rotation in the counterclockwise direction CCW. Then, the rotation angle is moved across the boundary a in the counterclockwise direction CCW, whereby a positive pulse is generated at a position 63 and the state value is changed to HP. If the state value is changed from LP to LN and then from LN to HP, the count value should have been changed to +2 (=+1+1). However, the state value is changed from LP to HP not through LN due to the pulse missing at the position 62. In this case, therefore, the count value is changed to +2 (see FIG. 5) for compensation for the influence of the pulse missing. Where the rotation direction is opposite to that described above, a similar behavior is observed. Therefore, the count value may contain an error of +1 during such behavior.

It is herein assumed that, within an angular range of one turn (360 degrees), a correct count value is 0 in a zone S0 (0 degree to 90 degrees) between the boundaries a and b, is 1 in a zone S1 (90 degrees to 180 degrees) between the boundaries b and c, is 2 in a zone S2 (180 degrees to 270 degrees) between the boundaries c and d, and is 3 in a zone S3 (270 degrees to 360 degrees) between the boundaries d and a. In this case, angular ranges A0, A1, A2 and A3 for which the count value can be 0, 1, 2 and 3, respectively, as determined in consideration of the count error described above, are as shown in FIG. 6. The angular ranges A0, A1, A2, A3 are greater than the angular ranges (90 degrees) of the respective zones S0, S1, S2, S3, but are smaller than one turn (360 degrees) as shown in FIG. 6. Since overlapping parts of the angular ranges A0, A1, A2, A3 do not extend over plural turns, the number of turns can be determined on a single-turn basis by using the count value and the angle detection value.

Figure 7:
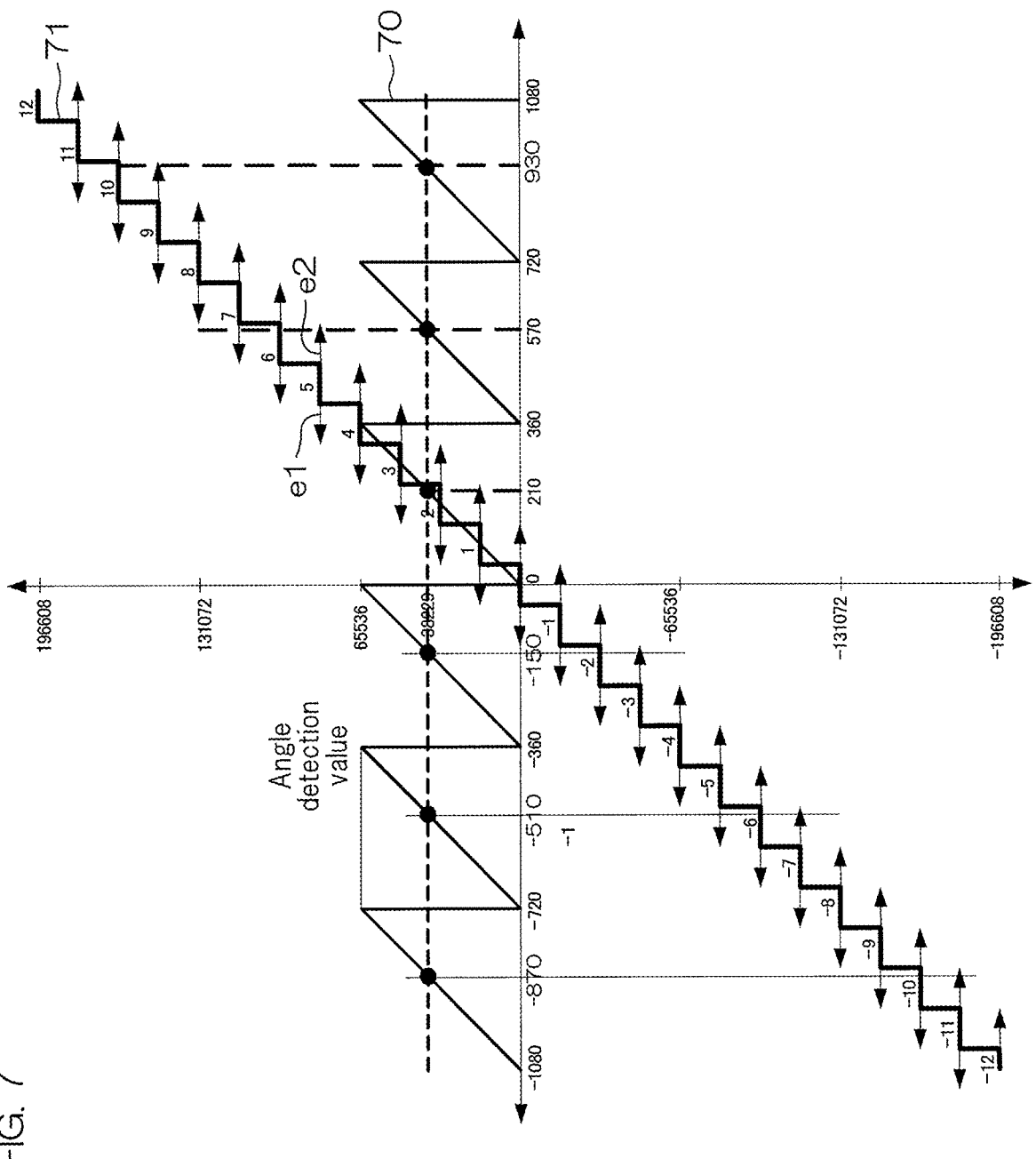
FIG. 7 shows a relationship between the count value of the segment counter and the angle detection value of a precision absolute angle detector.

FIG. 7 shows a relationship between the count value of the segment counter 2 and the angle detection value of the precision absolute angle detector 1. The abscissa indicates the rotation angle (degrees) of the rotation shaft 30, and the ordinate indicates the multiturn absolute angle value. The one turn (360 degrees) is expressed at a resolution of 16 bits (65536 steps). However, a precondition for this is that the segment number is $U_m$=2k=4.

As the rotation shaft 30 is rotated, the angle detection value of the precision absolute angle detector 1 is changed between 0 and 65536 in a serration form as indicated by a reference character 70.

On the other hand, as indicated by a reference character 71, the count value of the segment counter 2 is ideally changed stepwise as the rotation shaft 30 is rotated. It is ideal that count values for 90-degree angular zones (=360 degrees/4) respectively having medians spaced 90 degrees (=360 degrees/4) from each other with respect to a reference angle of 0 degree are, for example, . . . , −3, −2, −1, 0, 1, 2, 3, . . . . Since the count of the segment counter 2 is 4 per each turn, a step level per each count is 65536/4.

Actually, there is a possibility that, where the count value of the segment counter 2 contains an error as described above, the same count value is generated in error zones e1, e2 present on the opposite sides of each count value zone. In PTL 2, the magnetization state determining process is performed when the external power source is turned on, and the count value of the segment counter is corrected and synchronized with the angle detection value of the precision absolute angle detector for the elimination of the error zones. In this example embodiment, the count value of the segment counter 2 is combined with the angle detection value of the precision absolute angle detector 1 by using the error-containing count value of the segment counter 2 as it is without performing the process for the correction and the synchronization.

Specifically, as shown in FIG. 7, the count values of the segment counter 2 to be observed when the angle detection value of the precision absolute angle detector 1 is a certain value (e.g., 38229 which corresponds to 210 degrees in an angular range within one turn (0 degree to 360 degrees)) will be checked. In an angular range of multiple turns, the precision absolute angle detector 1 provides an angle detection value of 38229 (210 degrees) at multiturn angles spaced 360 degrees from each other with respect to a reference angle of 210 degrees. That is, the multiturn angles are . . . , −870 degrees, −510 degrees, −150 degrees, 210 degrees, 570 degrees, 930 degrees, . . . . In consideration of the count errors, possible values to be taken as the count value of the segment counter 2 for these multiturn angles are shown below in Table 1.

TABLE 1

| Multiturn angle | Count value |
|---|---|
| . . . | . . . |
| −870 degrees | −11, −10 or −9 |
| −510 degrees | −7, −6 or −5 |
| −150 degrees | −3, −2 or −1 |
| 210 degrees | 1, 2 or 3 |
| 570 degrees | 5, 6 or 7 |
| 930 degrees | 9, 10 or 11 |
| . . . | . . . |

Figure 8:
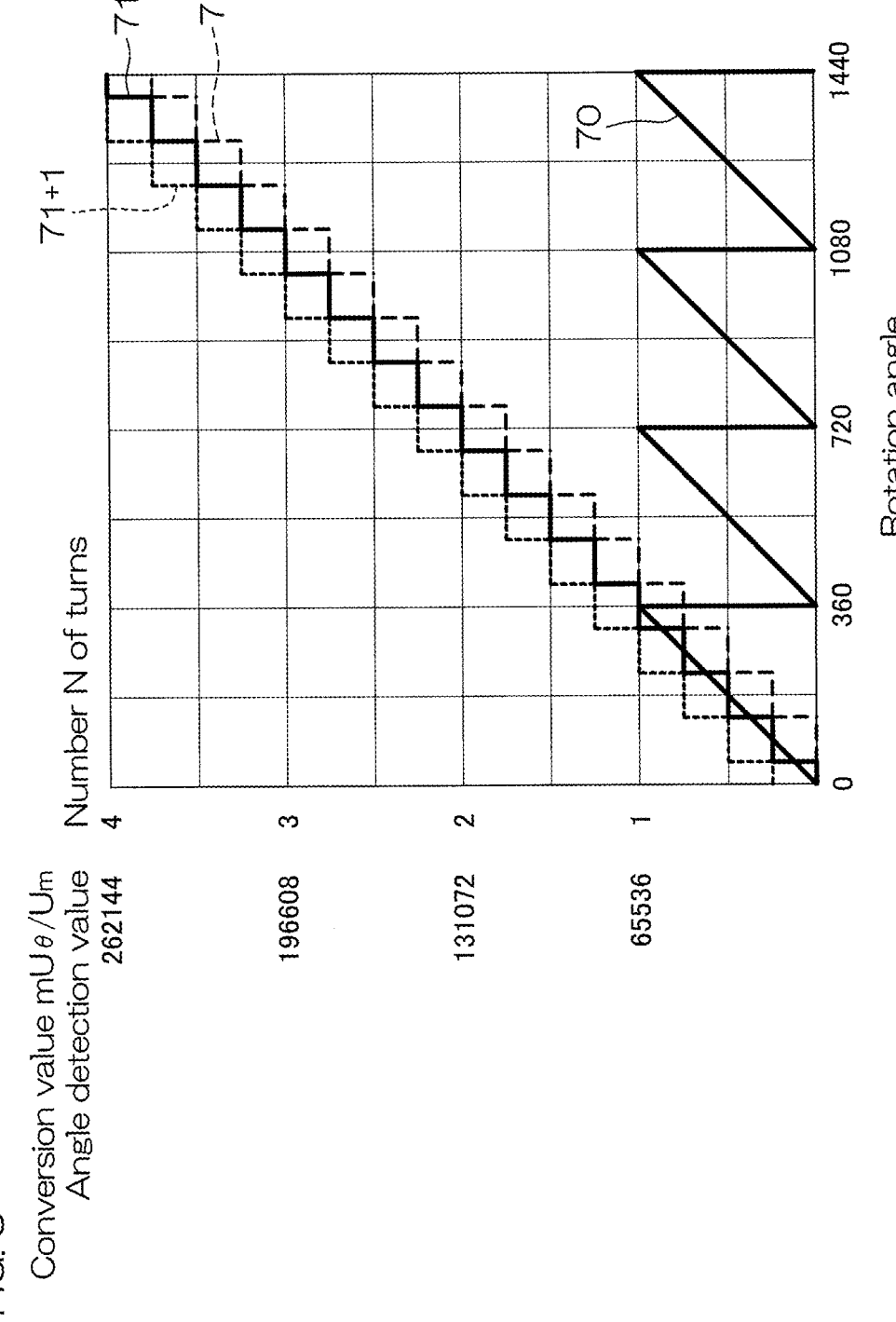
FIG. 8 shows the relationship between the count value of the segment counter and the angle detection value of the precision absolute angle detector.

FIG. 8 shows a change in the count value of the segment counter 2 in a positive rotation angle range. However, the count value of the segment counter 2 herein indicates a value obtained by dividing the count value by the number of the segments (4 in this example) (for conversion to the number N of turns). A line 70 indicates the angle detection value of the precision absolute angle detector 1 as in FIG. 7. A stepwise line 71 corresponds to the line 71 in FIG. 7. A line 71−1 indicates a change in a count value containing an error of −1 (an error obtained by dividing the error by a segment number of 4 is −0.25), and a line 71+1 indicates a change in a count value containing an error of +1 (an error obtained by dividing the error by a segment number of 4 is +0.25). The same conclusion as shown in Table 1 can be derived from FIG. 8.

Figure 9:
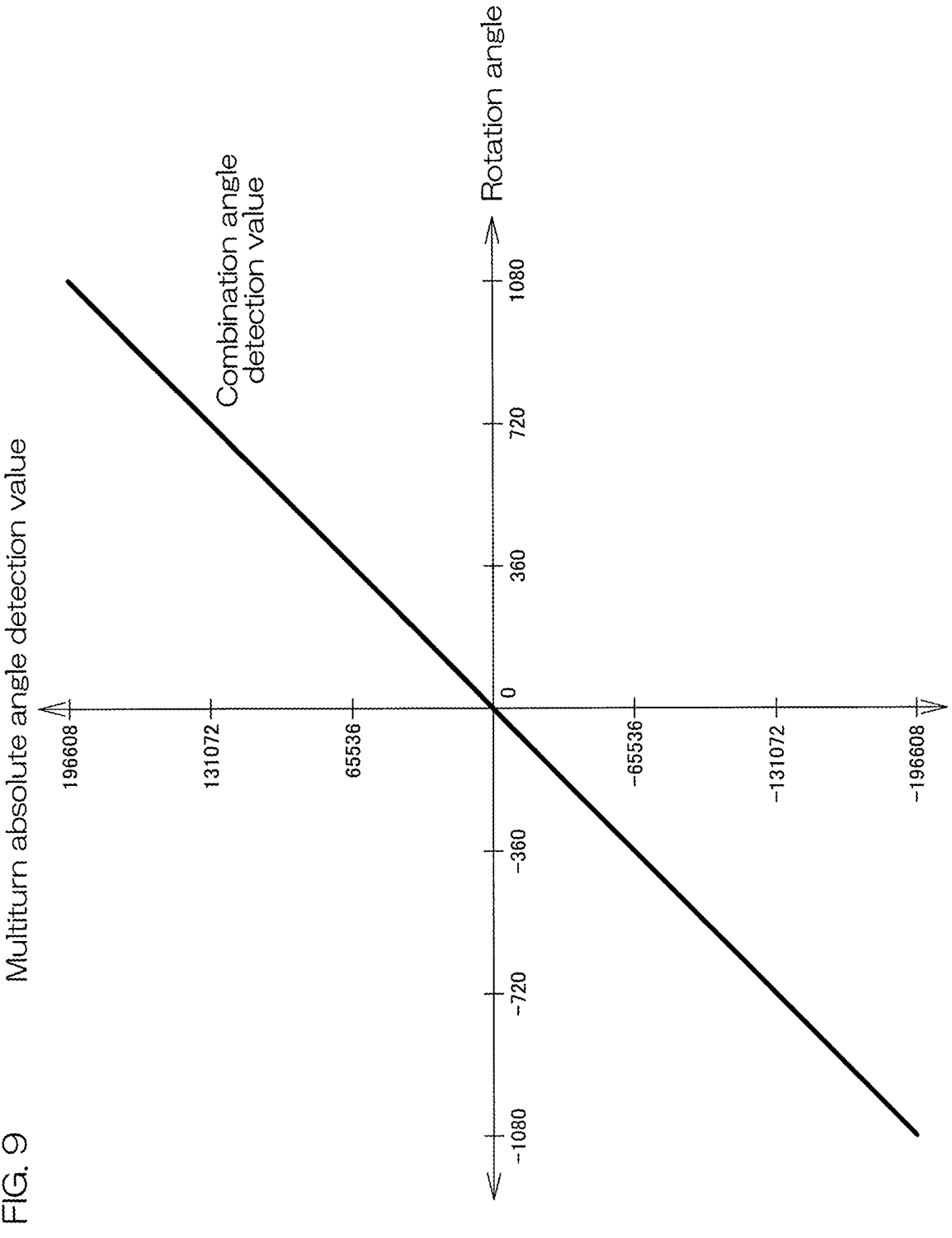
FIG. 9 shows a precise multiturn absolute angle detection value obtained by combining the count value of the segment counter with the angle detection value of the precision absolute angle detector.

Since the count values of the segment counter 2 each possibly cover an angular range of smaller than 360 degrees even in consideration of the errors, the same count value is not duplicately provided for different multiturn angles. Therefore, the multiturn absolute angle detection value can be uniquely determined by a combination of the count value of the segment counter 2 and the angle detection value detected by the precision absolute angle detector 1. Thus, as shown in FIG. 9, the multiturn absolute angle detection value can be generated by combining the count value of the segment counter 2 with the angle detection value detected by the precision absolute angle detector 1 without correcting the count error of the segment counter 2 and synchronizing the count value with the angle detection value.

The arithmetic device 4 computes the multiturn absolute angle detection value θmt, for example, by combining the count value m of the segment counter 2 with the angle detection value θ of the precision absolute angle detector 1 through the following computation with the use of the count value m of the segment counter 2 and the angle detection value θ of the precision absolute angle detector 1. FIG. 9 described above shows the result of the computation. In the following expression, N indicates the number of turns (rotation amount) from the reference point (rotational position origin) of the rotation shaft 30. $U_θ$ indicates an angle detection amount per each turn (e.g., $U_θ$=65536 (based on 16 bits)), and corresponds to the resolution of the precision absolute angle detector 1. Further, $U_m$ (e.g., $U_m$=2k=4) is the number of segments per each turn, and corresponds to the number of counts of the segment counter 2 per each turn.

$$θmt = N \times U_θ + θ \qquad \text{[Expression 1]}$$

$$N = INT\left(m/U_m - θ/U_θ + 1/2\right)$$

As indicated by the above expression, the number N of turns can be determined by dividing the count value m by the segment number $U_m$ for conversion to the number of turns, subtracting the rotation amount ($θ/U_θ$) corresponding to the angle detection value θ from the number of turns, and rounding the subtraction result. In the above expression, ½ is added to the subtraction result, and a rounding computation is performed by an integerization function INT (a function of rounding off a decimal part for the integerization).

The number N of turns thus determined is multiplied by the angle detection amount $U_θ$ per each turn, whereby the multiturn angle detection value can be determined for the count value m of the segment counter 2. The multiturn absolute angle detection value θmt indicating the precise multiturn absolute angle can be determined by adding the precise angle detection value θ within the single turn to the multiturn angle detection value.

A table preliminarily prepared may be used, as required, to perform a part or all of the aforementioned computation in the arithmetic device 4.

In the actual computation of the number N of turns, it is convenient to use the following expression equivalent to the above expression so as to avoid the handling of the decimal part.

$$N = INT\left\{\left(\frac{mU_θ}{U_m} - θ + \frac{U_θ}{2}\right)/U_θ\right\} \qquad \text{[Expression 2]}$$

Figure 10:
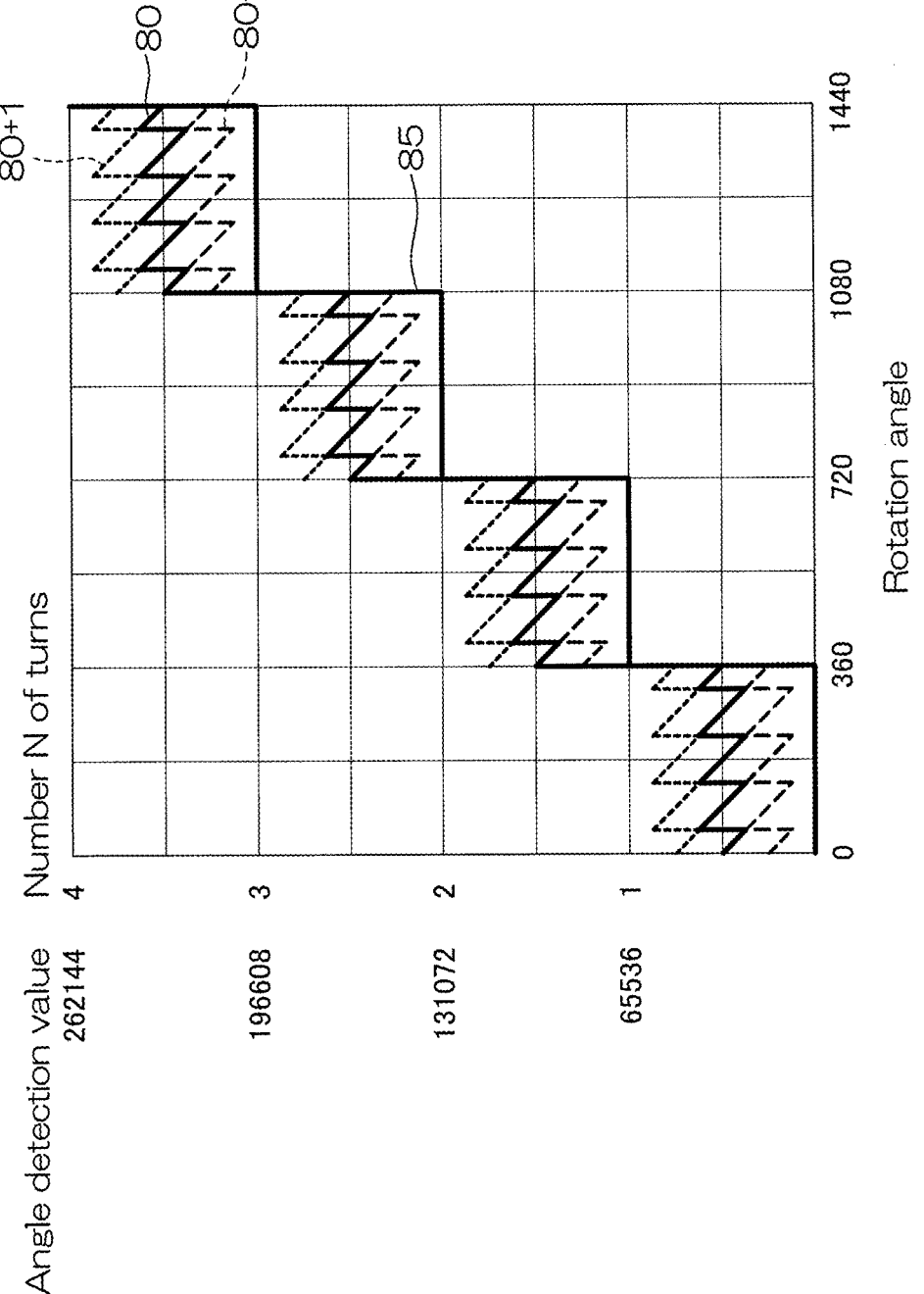
FIG. 10 is a diagram for describing the computation of the number of turns based on the count value of the segment counter by way of example.

That is, a conversion value $mU_θ/U_m$ obtained by multiplying the count value m by the angle detection amount $U_θ$ per each turn and dividing the multiplication result by the segment number $U_m$ is used. The conversion value $mU_θ/U_m$ is a value obtained by converting the count value m into the precise angle detection value. The conversion value $mU_θ/U_m$ is changed stepwise according to the rotation angle as indicated by the lines 71, 71−1, 71+1 in FIG. 8. A stepwise line indicating a serrate change at each step as shown in FIG. 10 is obtained by subtracting the precise angle detection value θ (the line 70 in FIG. 8) from the conversion value $mU_θ/U_m$ (the lines 71, 71−1, 71+1) shown in FIG. 8 to provide $mU_θ/U_m-θ$ and adding $U_θ/2$ to $mU_θ/U_m-θ$. Lines 80, 80−1, 80+1 respectively correspond to the lines 71, 71−1, 71+1 shown in FIG. 8, and are represented by $mU_θ/U_m-θ+U_θ/2$. The number N of turns represented by the above expression can be obtained, as indicated by a line 85 in FIG. 10, by dividing $mU_θ/U_m-θ+U_θ/2$ by $U_θ$ and integerizing the division result by the integerization function INT.

In this example embodiment, as described above, the segment counter 2 includes the sole power generation sensor 20 and the sensor element MS, and is configured so as to apply the two or more-cycle alternating magnetic field per each turn to the magnetic wire of the power generation sensor 20. The count value of the segment counter 2 having such a configuration can be handled with some error contained therein, and properly combined with the angle detection value generated by the precision absolute angle detector 1 to thereby provide the precise multiturn absolute angle detection value. This eliminates the need for the use of a plurality of power generation sensors 20, the need for the determination of the magnetization direction of the magnetic wire FE of the power generation sensor 20 and the need for the complicated correcting process and the synchronizing process based on the magnetization direction of the magnetic wire FE. Therefore, the precision multiturn absolute angle detection device can be provided, which has a smaller size and lower costs with a simplified configuration and yet has a higher resolution.

A second example embodiment of the present invention will be described.

The magnetic field generation source may be configured to include k magnets (k≥2) arranged on a circle defined about the rotation axis with their magnetic poles of the same polarity to be opposed to the power generation sensor. Even in this case, a k-cycle alternating magnetic field per each turn can be applied to the magnetic wire. Even in this case, the magnetic wire of the power generation sensor is preferably disposed parallel to a tangential line of the circle. Further, the power generation sensor preferably includes a first magnetic flux conducting piece and a second magnetic flux conducting piece respectively magnetically coupled to a first end and a second end of the magnetic wire. As the magnetic field generation source is rotated, the magnetic poles are sequentially moved closer to the first magnetic flux conducting piece and the second magnetic flux conducting piece. The power generation sensor generates a negative voltage pulse in a first state in which a magnetic flux from the magnetic field generation source is conducted through the first magnetic flux conducting piece, and generates a positive voltage pulse in a second state in which the magnetic flux from the magnetic field generation source is conducted through the second magnetic flux conducting piece. The segment counter counts these voltage pulses to thereby count 2k segments per each turn. In this case, typically, magnetic poles of the other polarity are not disposed on a circular track along which the magnetic poles of the k magnets having the same polarity pass. Therefore, the magnetic poles of the same polarity are sequentially brought into opposed relation to the power generation sensor, as the rotating body is rotated in one direction.

Consideration will be given, for example, to a case in which the magnetic field generation source is rotated together with the rotating body and any one of the magnetic poles is moved closer to the first magnetic flux conducting piece in a set state (a set state for the negative pulse generation) in which the soft layer and the hard layer of the magnetic wire are magnetized in a direction extending from the second magnetic flux conducting piece to the first magnetic flux conducting piece. The magnetic flux from that magnetic pole is conducted through the first magnetic flux conducting piece, whereby the magnetization direction of the soft layer of the magnetic wire is reversed to generate a negative pulse. When that magnetic pole is moved still closer to the first magnetic flux conducting piece, the magnetization direction of the hard layer is also reversed, and the magnetic wire is brought into a set state for the positive pulse generation. When the magnetic field generation source is further rotated and that magnetic pole is moved closer to the second magnetic flux conducting piece, the magnetic flux from that magnetic pole is conducted through the second magnetic flux conducting piece. Thus, the magnetization direction of the soft layer of the magnetic wire is reversed, and a positive pulse is generated. When that magnetic pole is moved still closer to the second magnetic flux conducting piece, the magnetization direction of the hard layer is also reversed, and the magnetic wire is brought into the set state for the negative pulse generation. The one magnetic pole thus passes through the detection region of the power generation sensor, whereby the two pulses are generated.

Where this arrangement is employed, the sensor element preferably detects whether or not any one of the magnetic poles of the magnetic field generation source is present at a position opposed to the middle portion of the power generation sensor. The boundaries between the segments each define an angular position such that the one magnetic pole is opposed to the middle portion of the power generation sensor. By causing the sensor element to detect whether or not any one of the magnetic poles of the magnetic field generation source is opposed to the middle portion of the power generation sensor, the rotational position and the rotation direction can be detected based on the outputs of the sensor element and the power generation sensor as in the example embodiment described above.

While the two example embodiments of the present invention have thus been described, the present invention may be embodied in some other ways as will be described by way of example.

In the example embodiment described above, the power generation sensor 20 including the L-shaped magnetic flux conducting pieces FL1, FL2 are used by way of example, but the magnetic flux conducting pieces may each have a different shape. For example, I-shaped magnetic flux conducting pieces each extending linearly from the magnetic wire FE toward the detection region may be used. Further, tubular magnetic flux conducting pieces each having substantially the same size as the coil may be provided on the opposite sides of the magnetic wire.

In the example embodiments described above, the magnetic field generation source 50 mainly described includes the two magnetic pole pairs (see FIG. 2A) or the two magnetic poles of the same polarity (second example embodiment). Alternatively, the magnetic field generation source 50 may include three or more magnetic pole pairs or three or more magnets of the same polarity, and the segment counter may include six or more segments.

Further, the precision absolute angle detector 1 does not necessarily mean a single detector, but may be merely required to function to measure an absolute angle within a single turn. For example, the precision absolute angle detector 1 may include a plurality of detectors each having a detection range of not greater than a single turn. For example, an angle based on 1 cycle/turn may be determined through computation by using the detection signal of a detector based on 32 cycles/turn and the detection signal of a detector based on 31 cycles/turn. Even in this case, the computation may be performed by the arithmetic device 4.

While the present invention has been described in detail by way of the example embodiments thereof, it should be understood that these example embodiments are merely illustrative of the technical principles of the present invention but not limitative of the invention. The scope of the present invention is to be limited only by the appended claims.

DESCRIPTION OF REFERENCE CHARACTERS

1: Precision absolute angle detector
2: Segment counter
3: Power supply circuit
4: Arithmetic device
5: Signal evaluation circuit
6: Rectification/power supply circuit
7: Signal processing circuit
8: Counter circuit
9: Nonvolatile memory
10: Counter memory IC 20: Power generation sensor
33: Rotation axis
50: Magnetic field generation source
100: Multiturn angle detection device
FE: Magnetic wire
FL1: First magnetic flux conducting piece
FL2: Second magnetic flux conducting piece
M: Magnet
MS: Sensor element
SP: Coil
SR: Detection region
a, b, c, d: Boundaries
n1, n2: N-poles
s1, s2: S-poles

The invention claimed is:

1. A multiturn angle detection device to generate a multiturn absolute angle detection value of a rotating body that is rotated about a rotation axis, the multiturn angle detection device comprising:

a segment counter to generate a count value according to the rotation of the rotating body by counting segments defined by dividing a single-turn cycle of the rotating body in an angular range over a single turn of the rotating body;

a precision absolute angle detector, operative with external electric power supply, to generate an absolute angle detection value within the single-turn cycle of the rotating body at a resolution higher than the segments; and an arithmetic device, operative with the external electric power supply, to generate the multiturn absolute angle detection value of the rotating body by combining the count value of the segment counter with the absolute angle detection value of the precision absolute angle detector;

wherein the segment counter includes a single power generation sensor, a magnetic field generation source to be rotated together with the rotating body about the rotation axis, a sensor element different from the power generation sensor, and a nonvolatile memory to store the count value;

wherein the power generation sensor includes a magnetic wire that exhibits a large Barkhausen effect, and a coil wound around the magnetic wire, and generates a voltage pulse according to a magnetic field change occurring due to the rotation of the magnetic field generation source;

wherein the magnetic field generation source applies a two or more-cycle alternating magnetic field per each turn of the rotating body axially of the magnetic wire;

wherein the segment counter is operative with an energy of the voltage pulse generated by the power generation sensor without receiving the external electric power supply and, when the power generation sensor generates the voltage pulse, determines a rotation direction and a rotational position of the rotating body by using a polarity of the voltage pulse (hereinafter referred to as "new voltage pulse polarity"), an output state of the sensor element observed when the voltage pulse is generated (hereinafter referred to as "new sensor element state"), a polarity of a previous voltage pulse (hereinafter referred to as "previous voltage pulse polarity"), an output state of the sensor element observed when the previous voltage pulse is generated (hereinafter referred to as "previous sensor element state"), and a count value updated by the generation of the previous voltage pulse and stored in the nonvolatile memory (hereinafter referred to as "previous count value"), and updates the count value and stores the updated count value in the nonvolatile memory;

wherein the segment counter is configured to update the count value by:

determining the rotation direction of the rotating body based on a combination of the new voltage pulse polarity and the new sensor element state to determine a count amount sign;

setting a count amount absolute value to 1 if the new voltage pulse polarity is different from the previous voltage pulse polarity;

setting the count amount absolute value to 0 if the new voltage pulse polarity is the same as the previous voltage pulse polarity and the new sensor element state is the same as the previous sensor element state;

setting the count amount absolute value to 2 if the new voltage pulse polarity is the same as the previous voltage pulse polarity and the new sensor element state is different from the previous sensor element state; and prefixing the determined count amount sign to the count amount absolute value to obtain a count amount, and adding the count amount to the previous count value;

wherein the arithmetic device uses the count value stored in the nonvolatile memory as it is when receiving the external electric power supply, and generates the multiturn absolute angle detection value of the rotating body by combining the count value of the segment counter with the absolute angle detection value of the precision absolute angle detector.

2. The multiturn angle detection device according to claim 1, wherein when the power generation sensor generates the voltage pulse, the segment counter stores the polarity of the voltage pulse and the output state of the sensor element observed at the generation of the voltage pulse in the nonvolatile memory.

3. The multiturn angle detection device according to claim 1, wherein the segment counter counts segments that are defined by dividing the single-turn cycle of the rotating body into four or more.

4. The multiturn angle detection device according to claim 1, wherein the magnetic field generation source includes two or more magnetic pole pairs disposed on a circle defined about the rotation axis with their N-poles and S-poles alternately arranged.

5. The multiturn angle detection device according to claim 4, wherein the magnetic wire of the power generation sensor is located on a tangential line of a circle defined about the rotation axis with its middle point located at a contact point on the tangential line.

6. The multiturn angle detection device according to claim 5, wherein the power generation sensor includes a first magnetic flux conducting piece and a second magnetic flux conducting piece respectively magnetically coupled to opposite ends of the magnetic wire.

7. The multiturn angle detection device according to claim 4, wherein the sensor element detects a polarity of any one of the magnetic poles opposed to the middle portion of the power generation sensor.

8. A segment counter which counts segments defined by dividing a single-turn cycle of a rotating body to be rotated about a rotation axis in an angular range over a single turn of the rotating body to generate a count value according to the rotation of the rotating body, the segment counter comprising:

a single power generation sensor;

a magnetic field generation source that is rotated together with the rotating body about the rotation axis;

a sensor element different from the power generation sensor;

a nonvolatile memory to store the count value; and a counter circuit to update the count value;

wherein the power generation sensor includes a magnetic wire that exhibits a large Barkhausen effect, and a coil wound around the magnetic wire, and generates a voltage pulse according to a magnetic field change occurring due to the rotation of the magnetic field generation source;

wherein the magnetic field generation source applies a two or more-cycle alternating magnetic field per each turn of the rotating body axially of the magnetic wire;

wherein, when the power generation sensor generates the voltage pulse, the counter circuit determines a rotation direction and a rotational position of the rotating body by using a polarity of the voltage pulse (hereinafter referred to as "new voltage pulse polarity"), an output state of the sensor element observed when the voltage pulse is generated (hereinafter referred to as "new sensor element state"), a polarity of a previous voltage pulse (hereinafter referred to as "previous voltage pulse polarity"), an output state of the sensor element observed when the previous voltage pulse is generated (hereinafter referred to as "previous sensor element state"), and a count value updated by the generation of the previous voltage pulse and stored in the nonvolatile memory (hereinafter referred to as "previous count value"), and updates the count value and stores the updated count value in the nonvolatile memory;

wherein the counter circuit is configured to update the count value by:

determining the rotation direction of the rotating body based on a combination of the new voltage pulse polarity and the new sensor element state to determine a count amount sign;

setting a count amount absolute value to 1 if the new voltage pulse polarity is different from the previous voltage pulse polarity;

setting the count amount absolute value to 0 if the new voltage pulse polarity is the same as the previous voltage pulse polarity and the new sensor element state is the same as the previous sensor element state;

setting the count amount absolute value to 2 if the new voltage pulse polarity is the same as the previous voltage pulse polarity and the new sensor element state is different from the previous sensor element state; and prefixing the determined count amount sign to the count amount absolute value to obtain a count amount, and adding the count amount to the previous count value.

* * * * *